United States Patent [19]

Chu et al.

[11] Patent Number: 5,367,629
[45] Date of Patent: Nov. 22, 1994

[54] DIGITAL VIDEO COMPRESSION SYSTEM UTILIZING VECTOR ADAPTIVE TRANSFORM

[75] Inventors: Frank J. Chu, San Jose; C. Lung Yeh, Saratoga, both of Calif.

[73] Assignee: ShareVision Technology, Inc., San Jose, Calif.

[21] Appl. No.: 993,039

[22] Filed: Dec. 18, 1992

[51] Int. Cl.$^5$ .............................................. G06F 15/62
[52] U.S. Cl. .................................... 395/162; 382/56; 345/202; 348/400; 348/403
[58] Field of Search ............... 358/426, 133, 433, 470, 358/432, 427, 160, 166; 345/189, 202; 395/162-166; 382/56; 348/384, 403, 405, 406, 409, 415

[56] References Cited

U.S. PATENT DOCUMENTS

| | | |
|---|---|---|
| 4,302,775 | 11/1981 | Widergren et al. |
| 4,394,774 | 7/1983 | Widergren et al. |
| 4,698,672 | 10/1987 | Chen et al. ............... 348/415 |
| 4,704,628 | 11/1987 | Chen et al. ............... 348/400 |
| 4,821,119 | 4/1989 | Gharavi |
| 4,907,276 | 3/1990 | Aldersberg |
| 4,955,048 | 9/1990 | Iwamura et al. |
| 4,962,521 | 10/1990 | Komatsu et al. |
| 5,005,976 | 4/1991 | Tamm et al. |
| 5,164,980 | 11/1992 | Bush et al. |
| 5,227,878 | 7/1993 | Puri et al. ............... 348/416 |
| 5,241,372 | 8/1993 | Ohba |

FOREIGN PATENT DOCUMENTS

2173675  3/1985  United Kingdom .

OTHER PUBLICATIONS

"Transformation Compensation for Videophone Image Coding," by Kato, NTT Laboratories, 1-2356, Take, Japan, 2 pages.

"A 4.8 KBPS Multi-Band Excitation Speech Coder," by Hardwick et al., Reprint from Proceedings from ICASSP-International Conf. on Acoustics, Speech, and Signal Processing, New York, Apr. 11-14, 1988, pp. 374-377.

"High Quality Coding of Telephone Speech and Wideband Audio," by Jayant, IEEE Communications Magazine, Jan. 1990, pp. 10-20.

(List continued on next page.)

*Primary Examiner*—Robert L. Richardson
*Attorney, Agent, or Firm*—Majestic, Parsons, Siebert & Hsue

[57] ABSTRACT

A video compression system comprises a pre-processing section, an encoder, and a post-processing section. The pre-processing section employs a median decimation filter which combines median filtering and decimation process. The preprocessing section also employs adaptive temporal filtering and content adaptive noise reduction filtering to provide images with proper smoothness and sharpness to match the encoder characteristics. The encoder employs a two pass look-ahead allocation rate buffer control scheme where the numbers of bits allocated and subsequently generated for each block may differ. In the first pass, the means square error for each block is estimated to determine the number of bits assigned to each block in a frame, In the second pass, the degree of compression is controlled as a function of the total number of bits generated for all the preceding blocks and the sum of the bits allocated to such preceding blocks. The DCT coefficients are vector coded by scanning the coefficients using three different scan paths, and the one providing the most compact path is chosen. Each scan vector is divided into eight zones and coded using variable length coding. An all vector module is employed to take advantage of the low rate coding. Background information is employed in addition to the previous frame for prediction to achieve better coding gain. The post-processing section filters block boundaries to remove blocking artifacts. Depending on the image characteristic (average quantization applied), different kinds of filtering is applied to enhance the images.

11 Claims, 20 Drawing Sheets

OTHER PUBLICATIONS

"Motion Video Coding in CCITT SG XV–The Video Source Coding," by Plompen et al., IEEE, 1988, pp. 31.2.1–31.2.8.

"Still Picture Compression Algorithms Evaluated for International Standardisation," by Leger et al., IEEE, 1988, pp. 1028–1031.

"Digital Picture Processing," by Rosenfield et al., 1982, pp. 150–165.

"You are There . . . and in Control," by Luther, IEEE Spectrum, 1988, pp. 45–50.

"KDD System Sends Color Images on Voice–Grade Phone Lines," by Yamaguchi, JEE, vol. 22, No. 225, Sep. 1985, pp. 7, 76–78.

"8×8 Discrete Cosine Transform (DCT)," SGS–Thomson Microelectronics, STV3208, Sep. 1990, p. 99.

"16–Bit, 48 kHz, Stereo Audio Codec," Crystal Semiconductor Corporation, Jul. 1991, 1 page.

"CS5412 Evaluation Board," Crystal Semiconductor Corporation, CDB5412, Jan. 1989, 1 page.

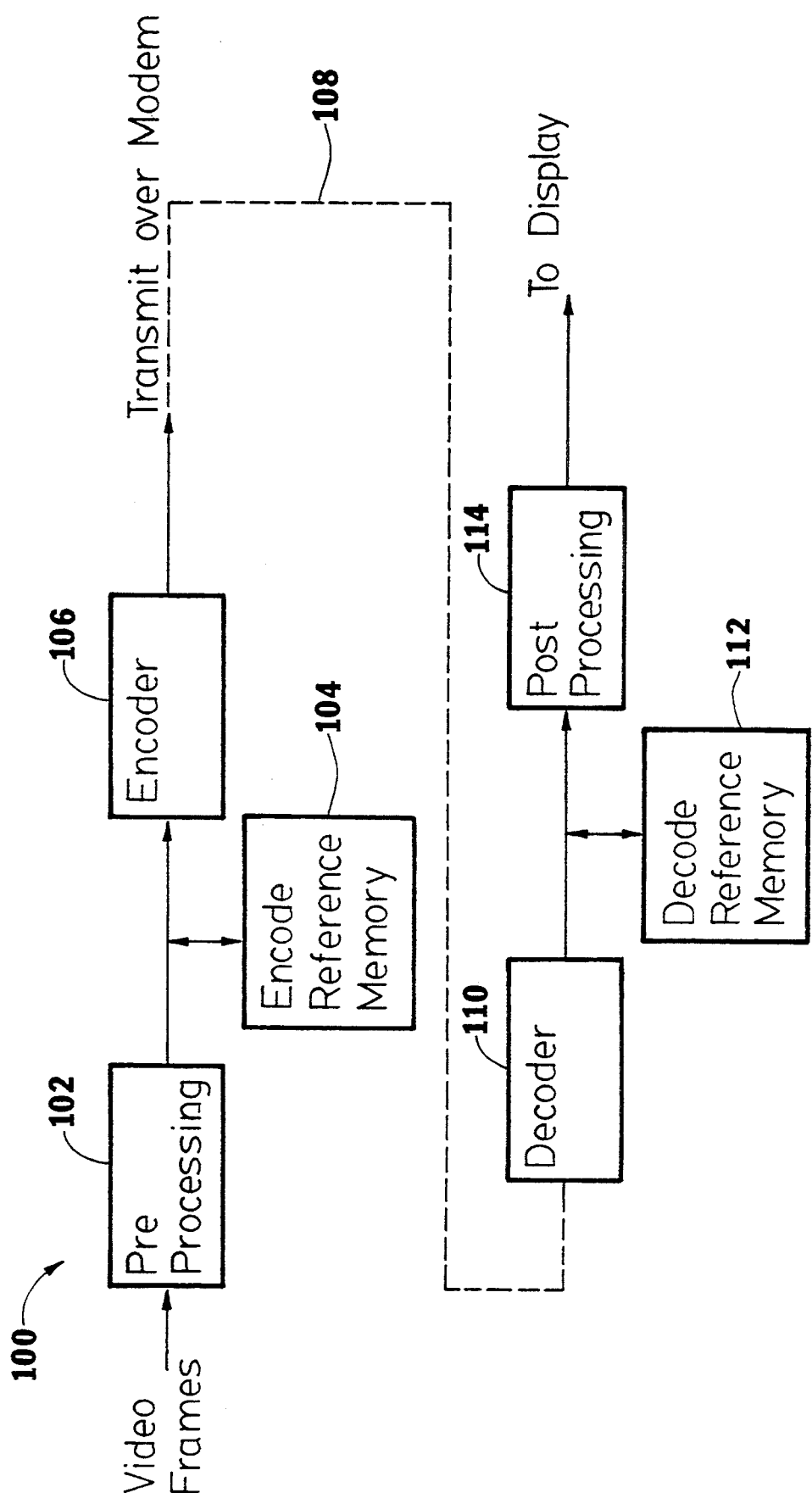
fig._1.

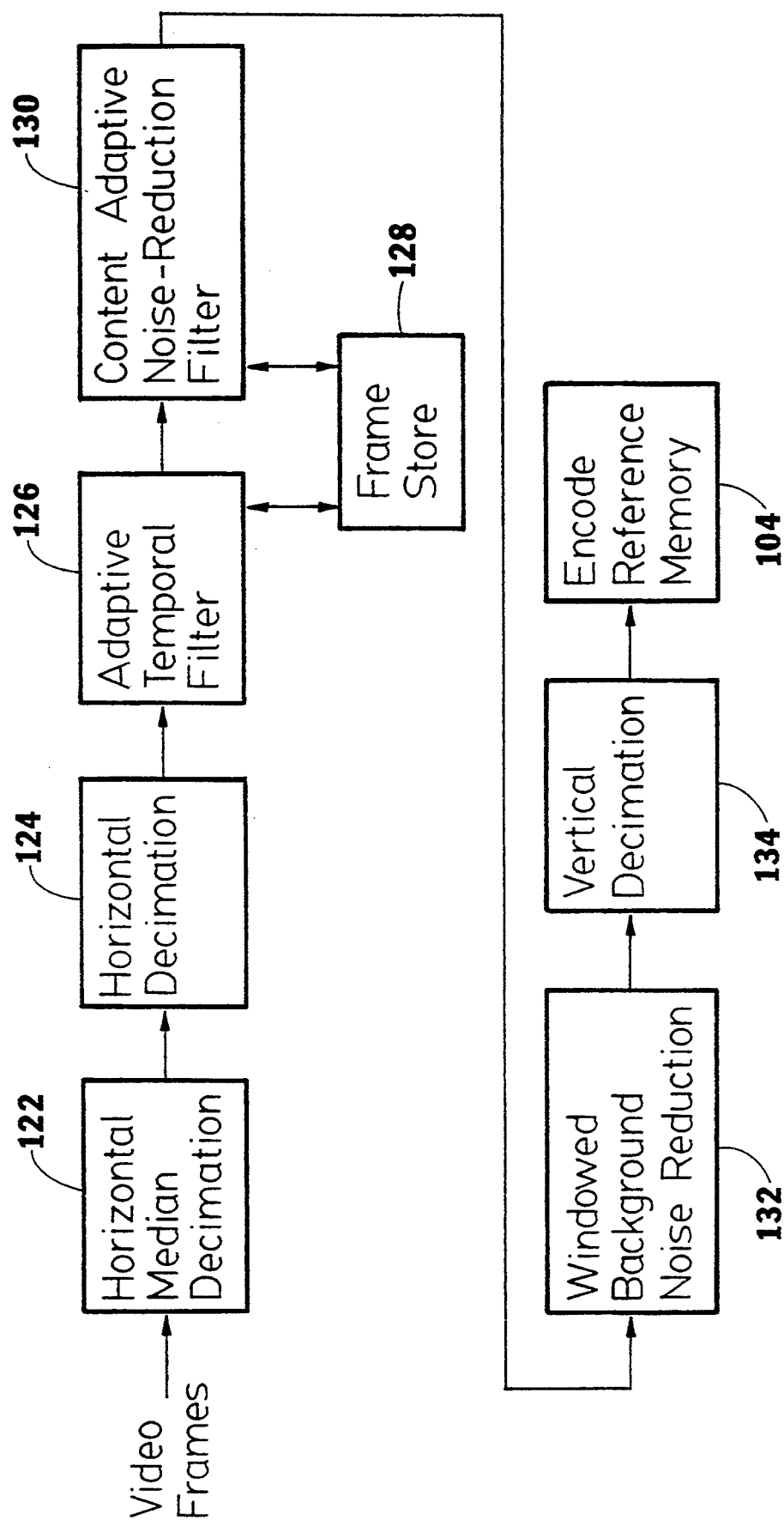
fig._2.

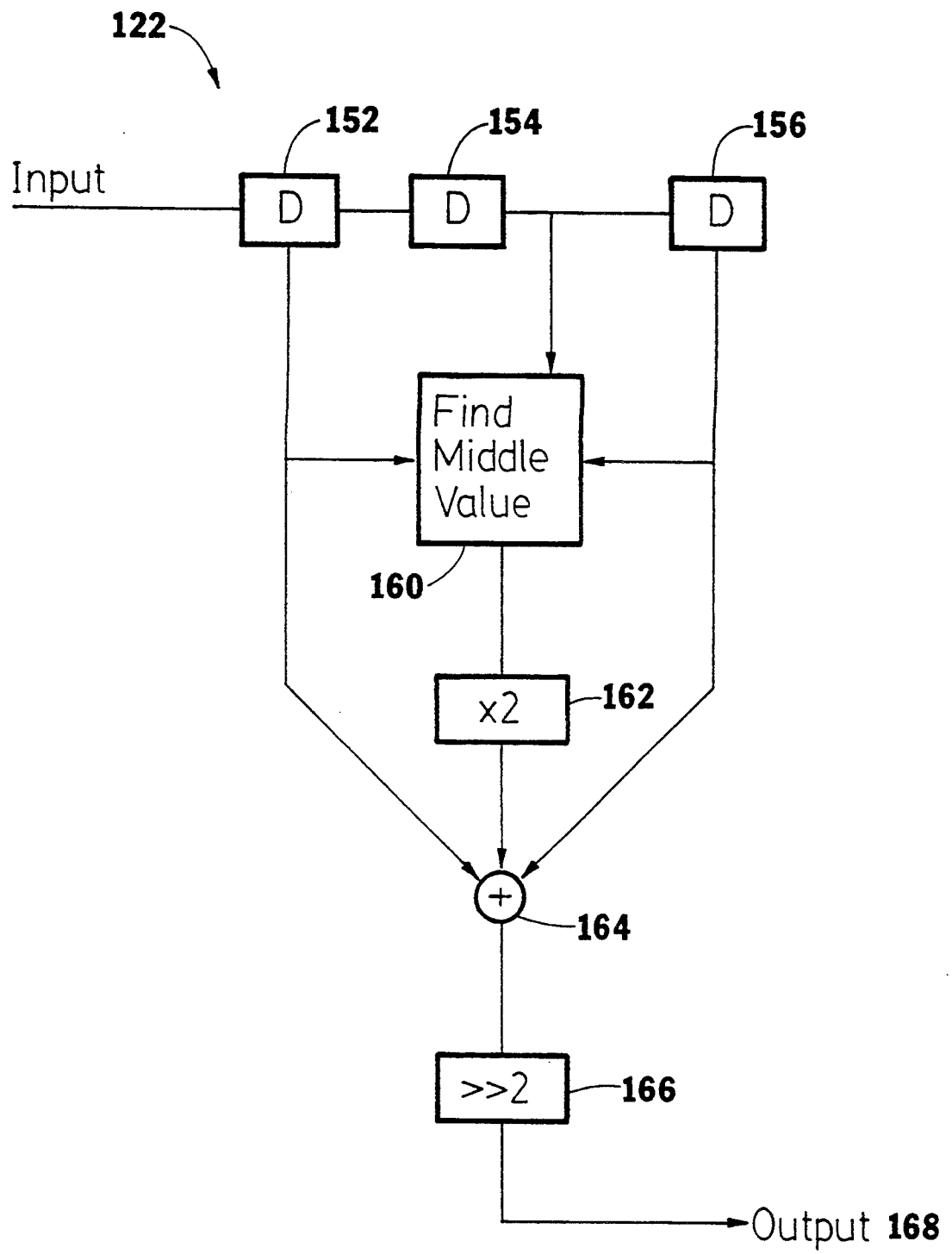
fig._3.

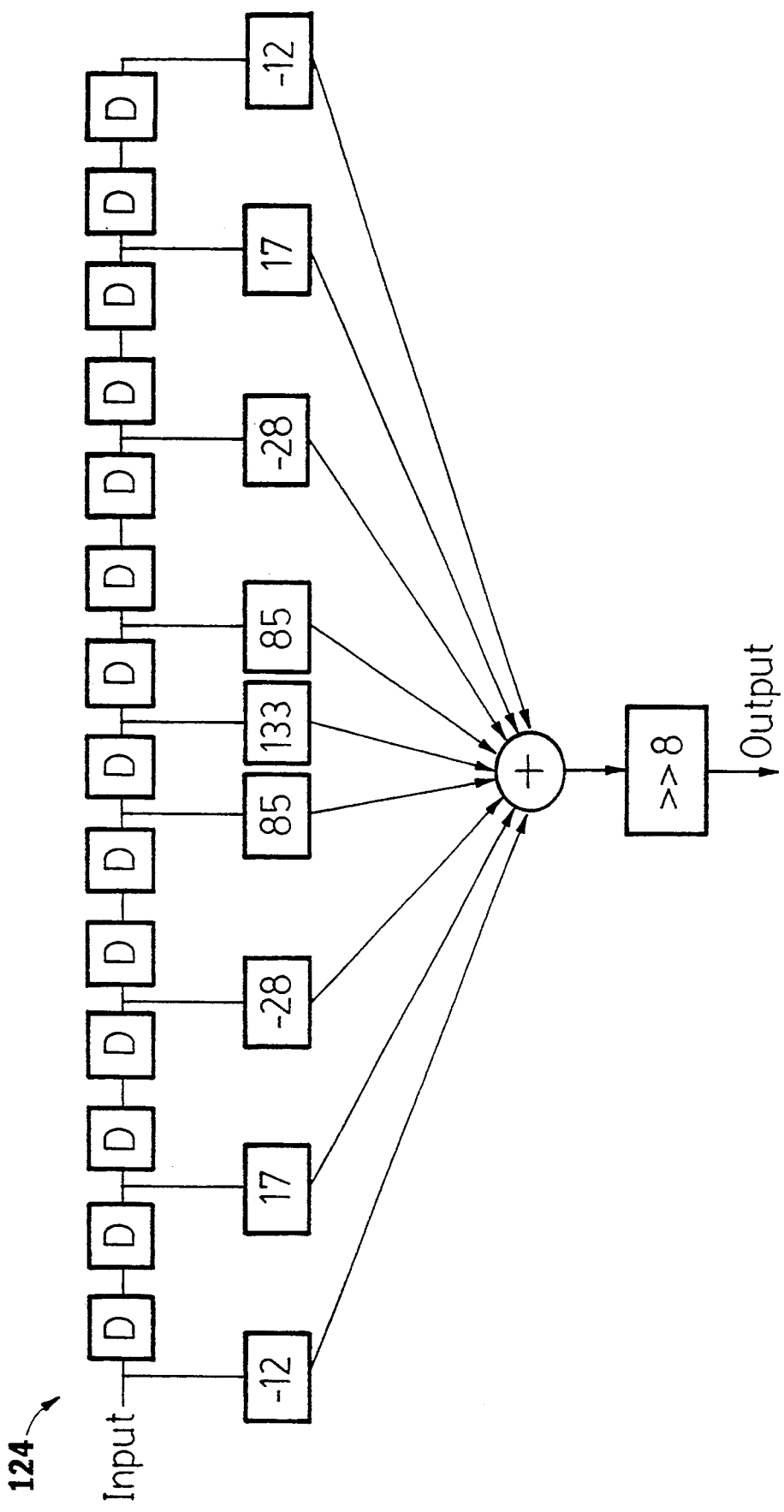
Prior Art
fig._4.

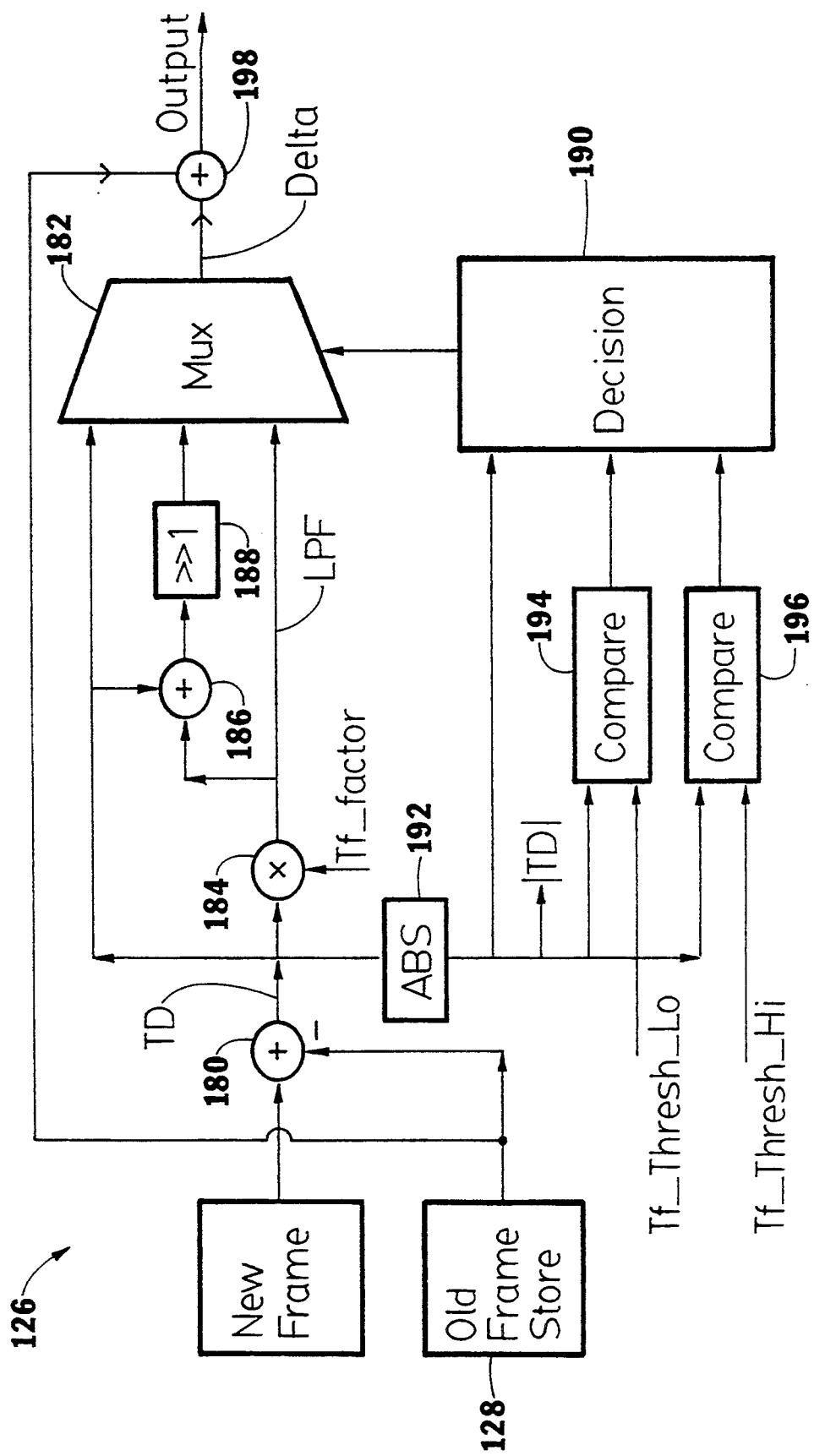
fig._5.

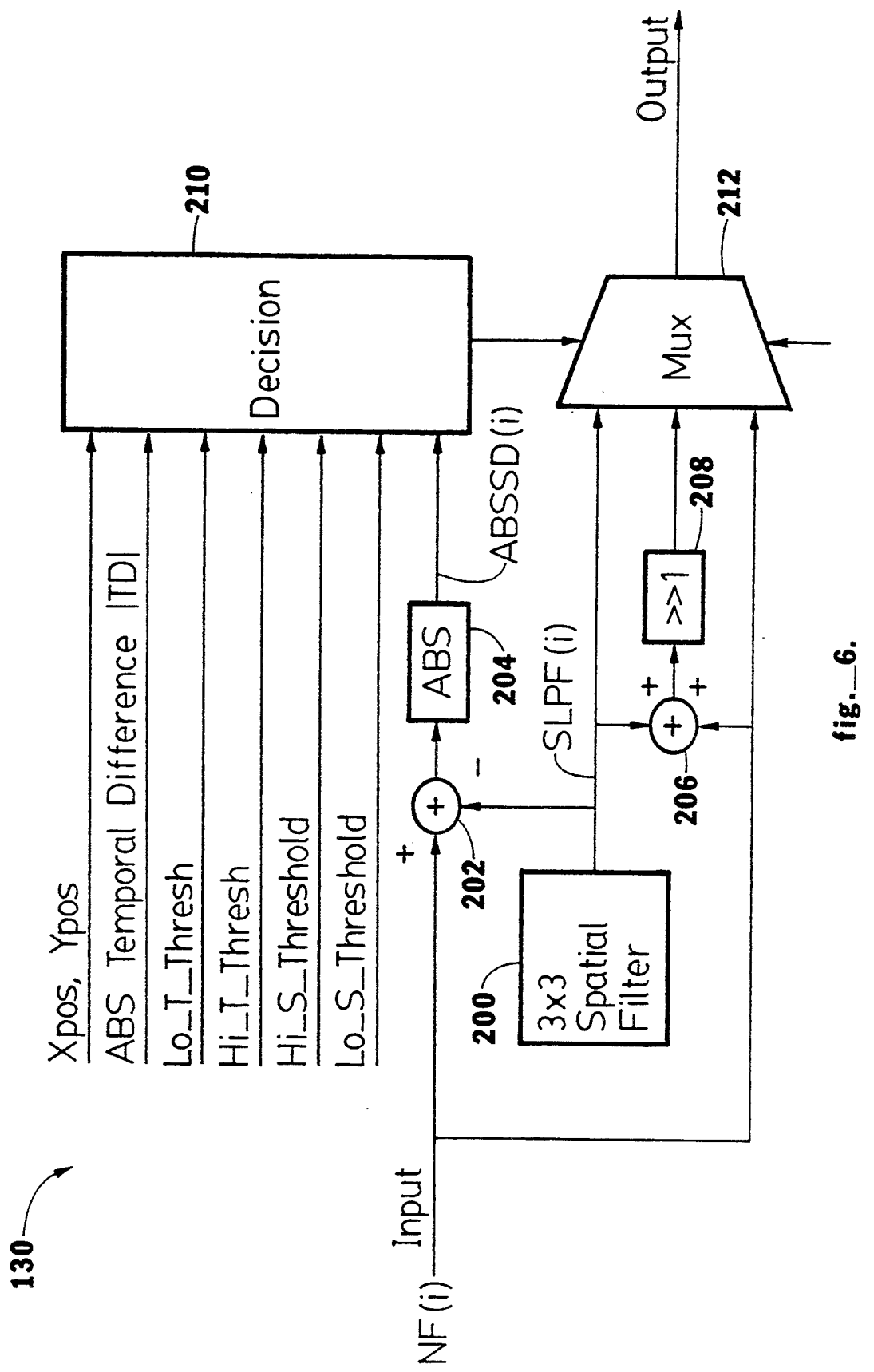
fig._6.

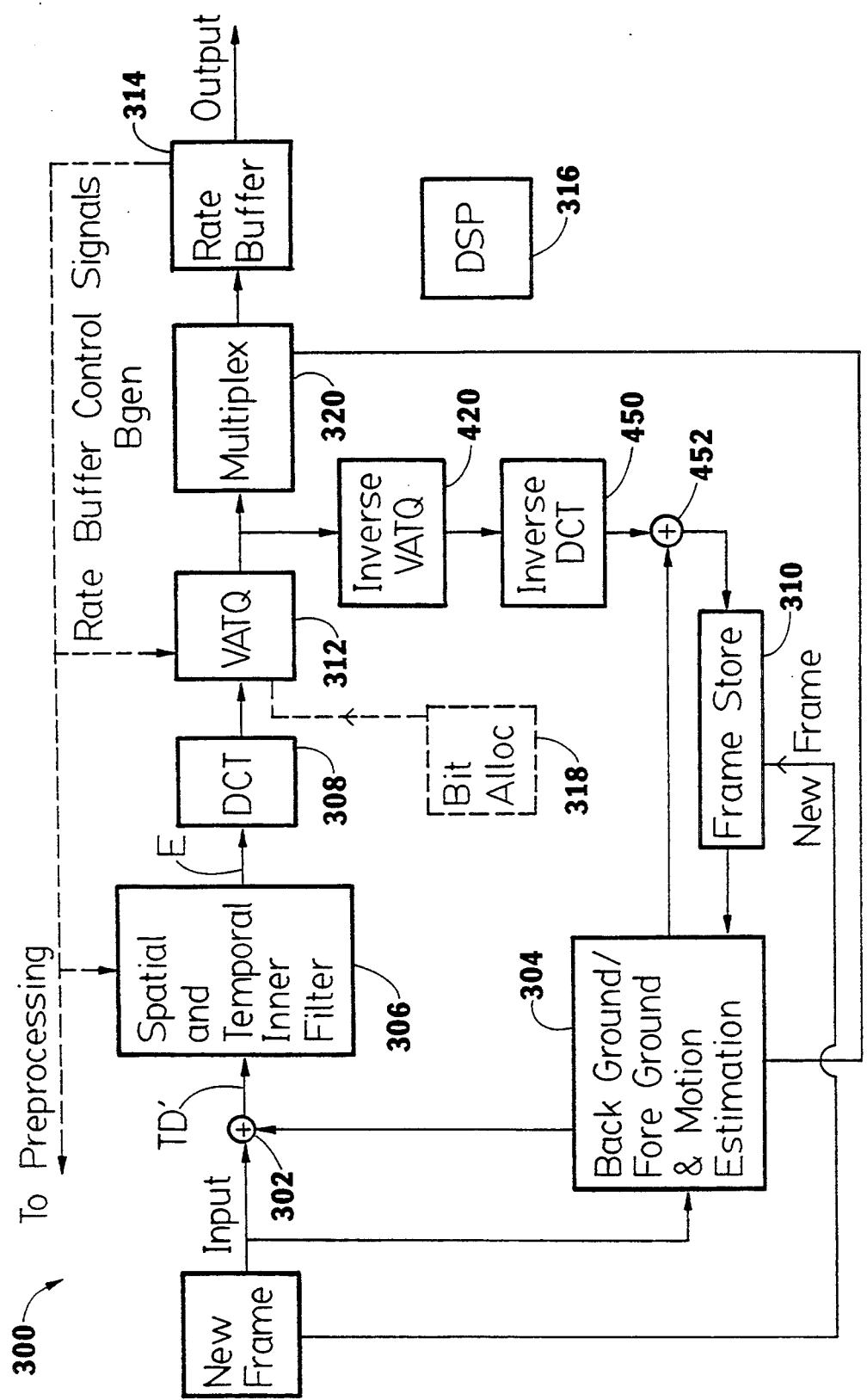
fig._7.

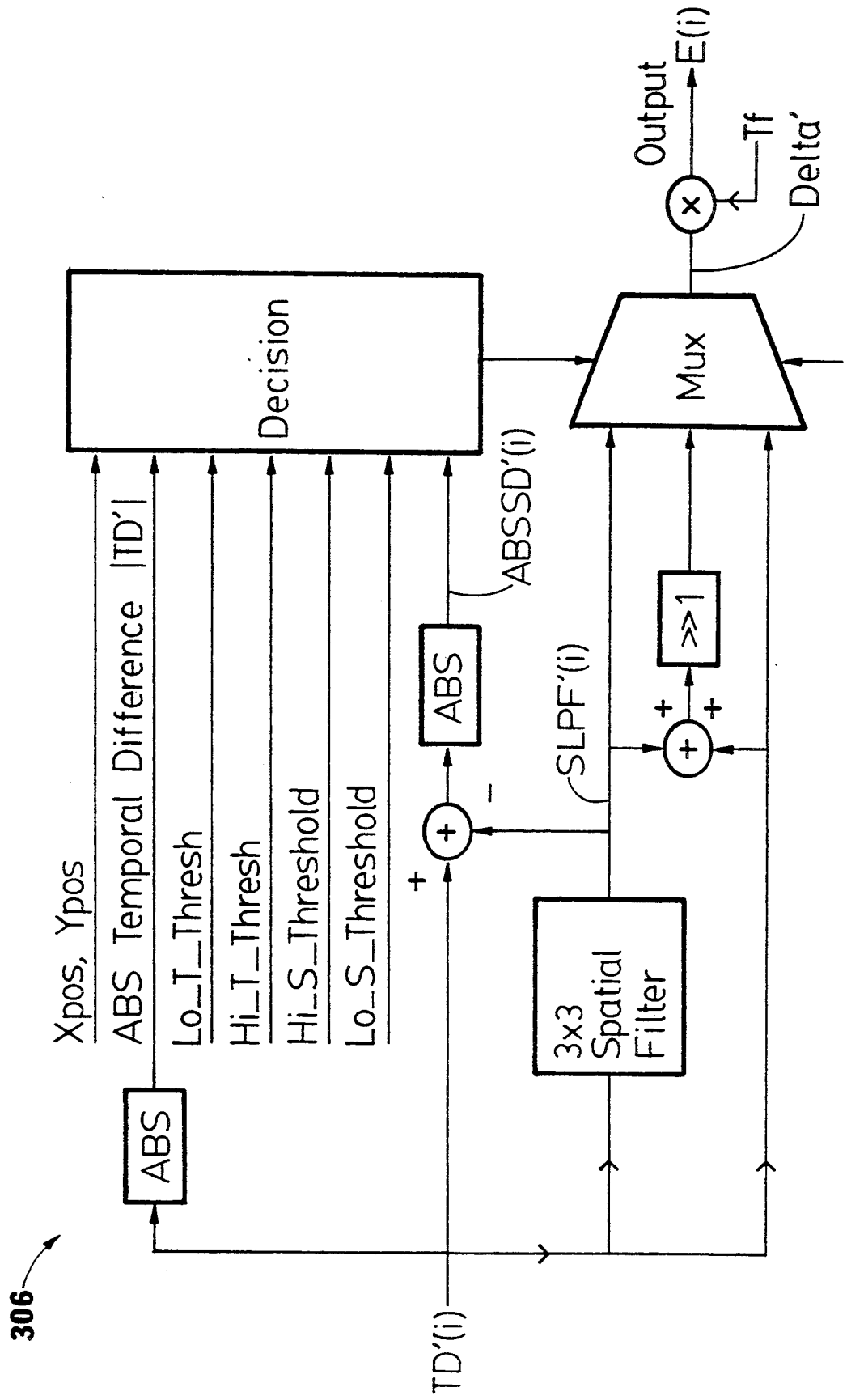
fig._8.

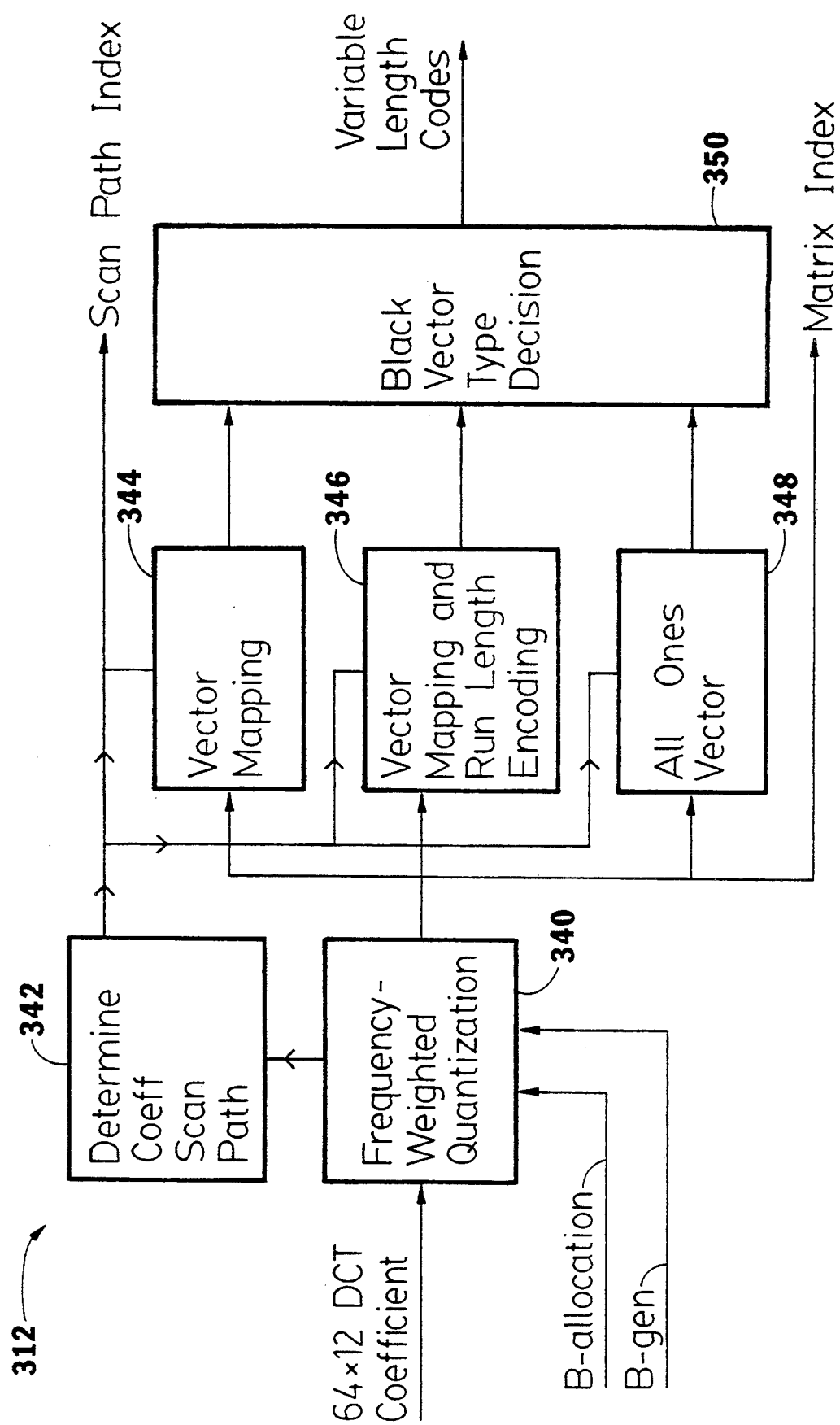

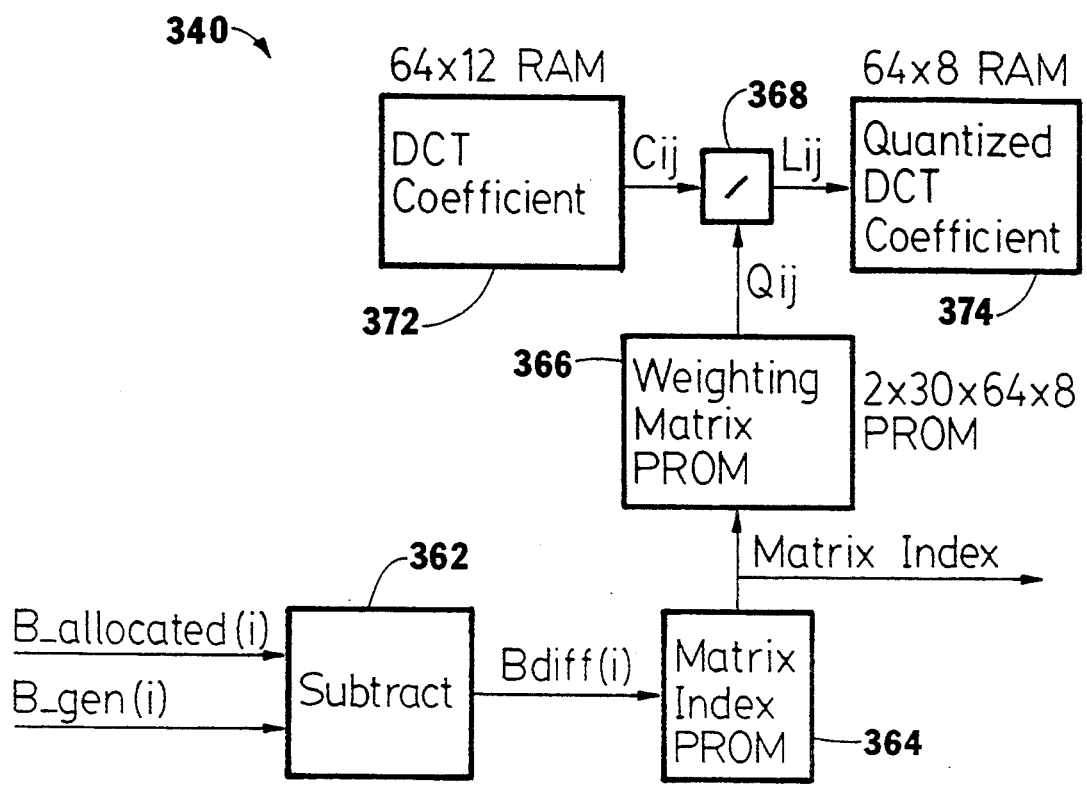
fig.—10A.
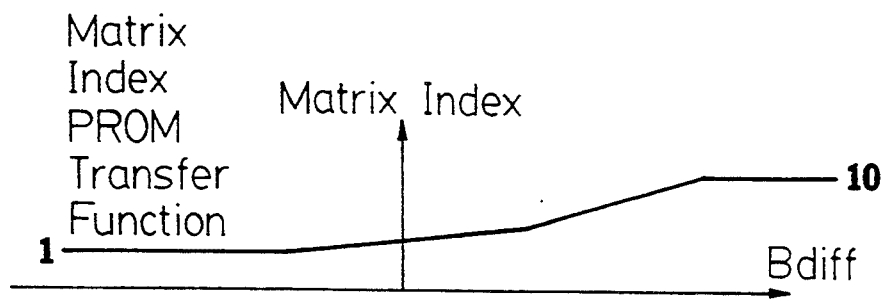
fig.—10B.

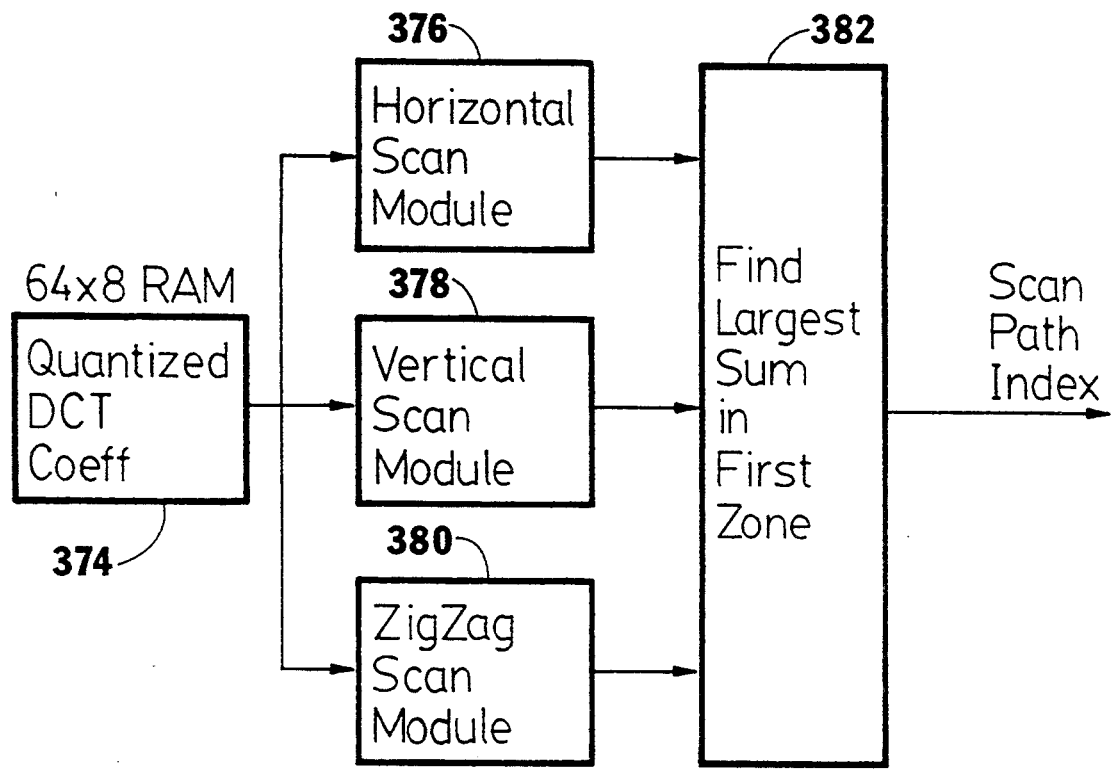
fig.—11A.
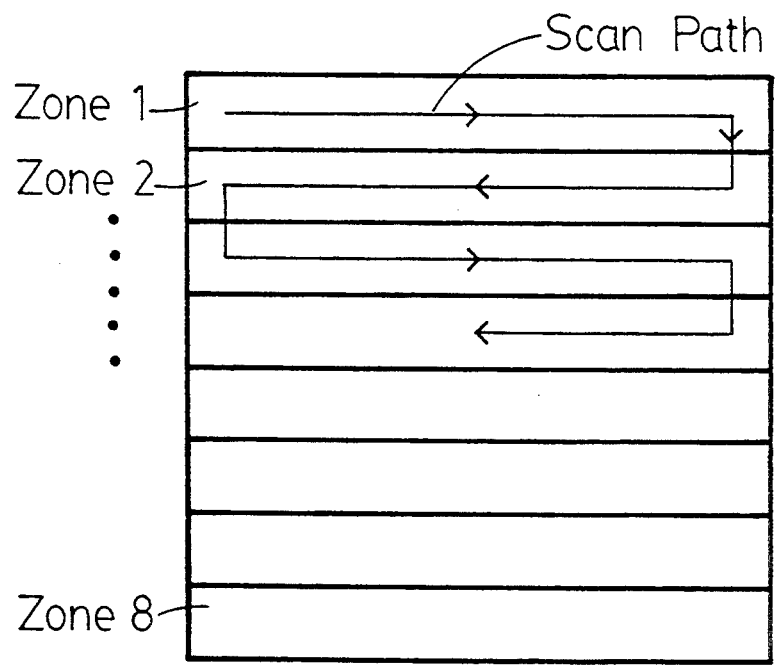
fig.—11B.

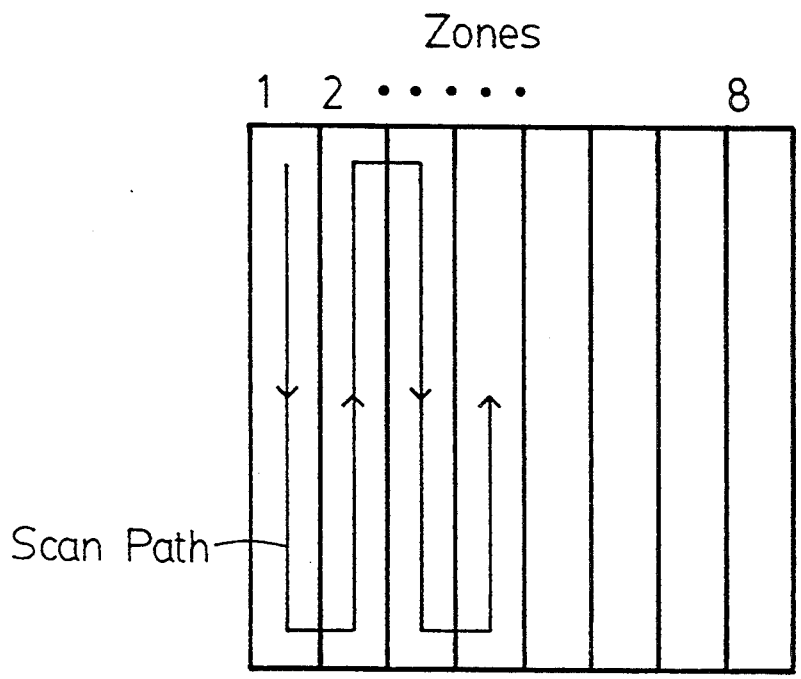
fig.__11C.
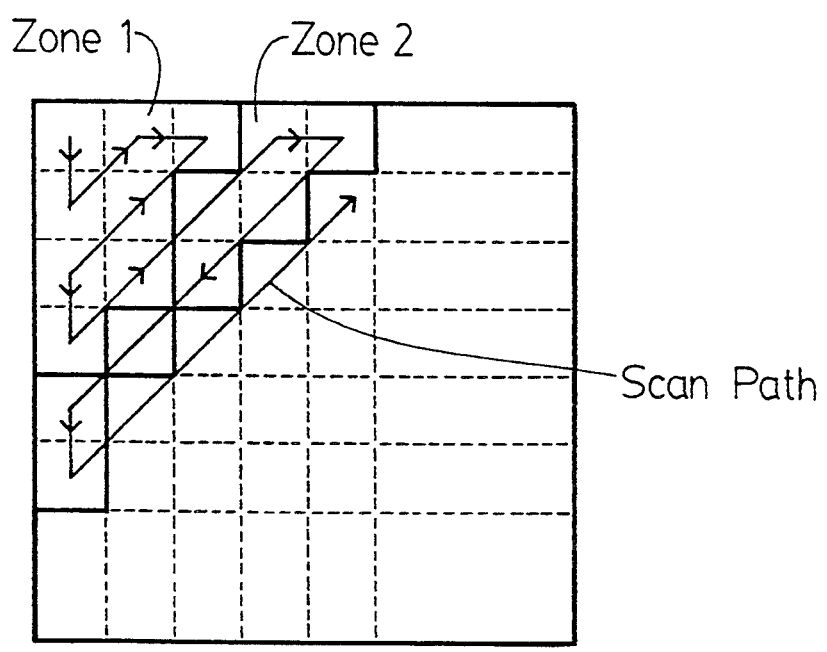
fig.__11D.

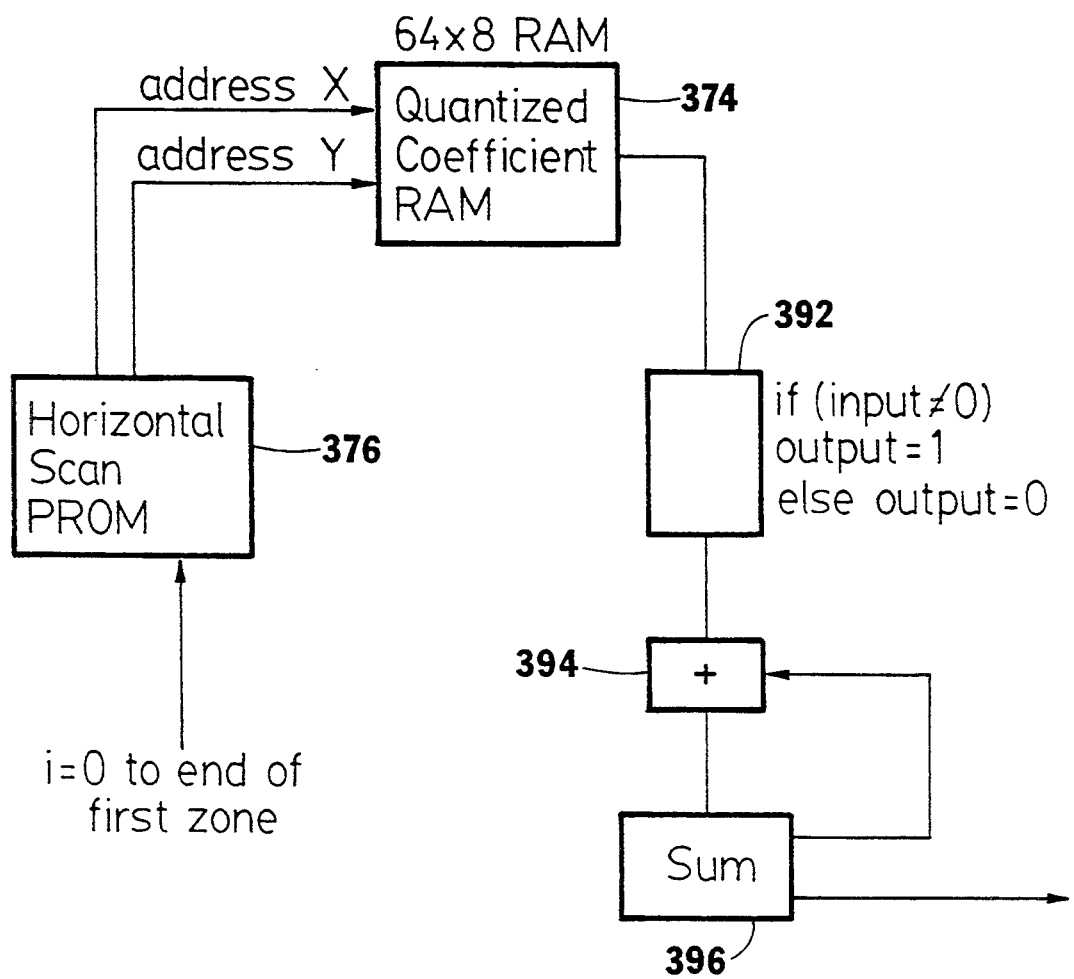
fig._12.

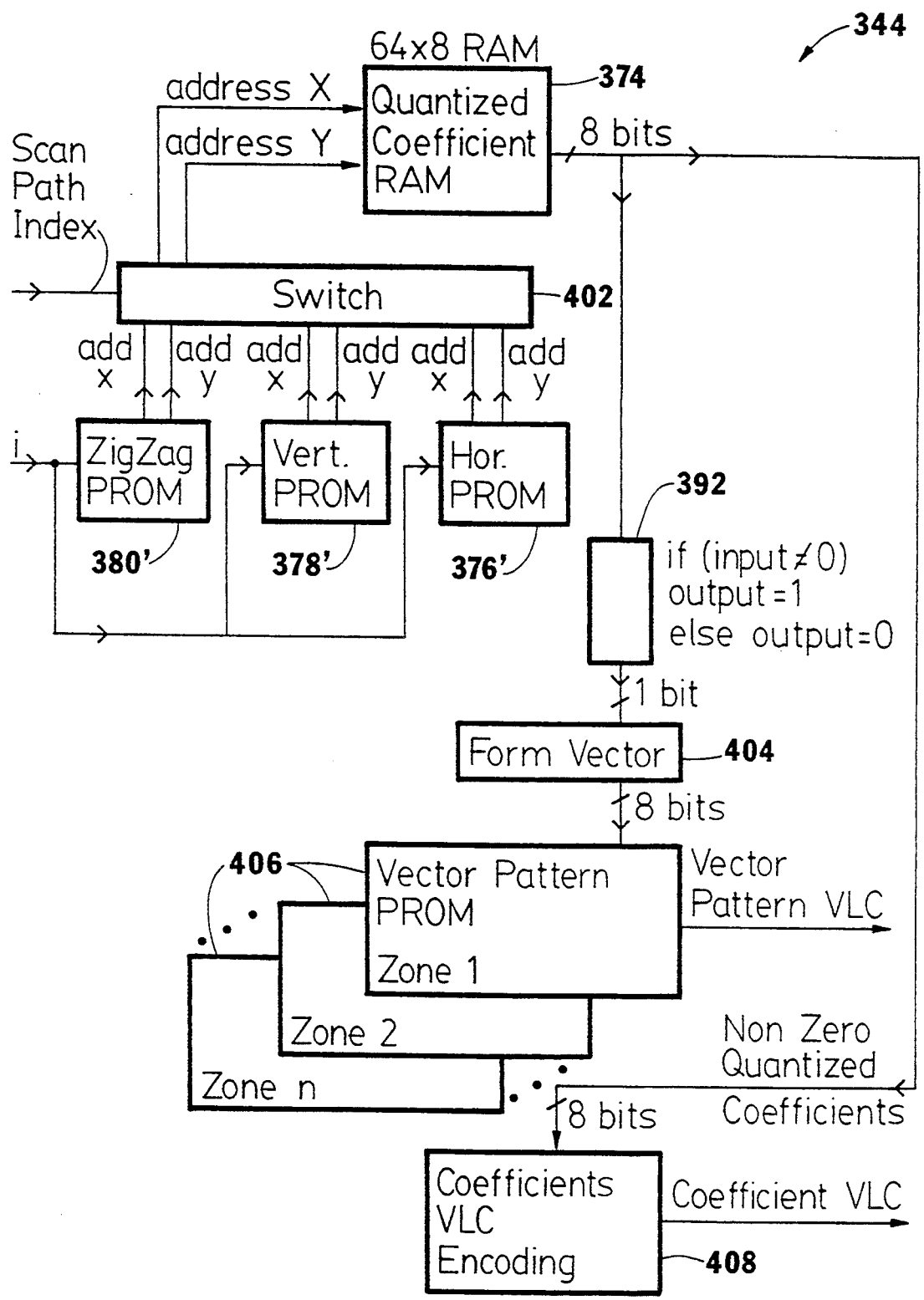
fig. __13.

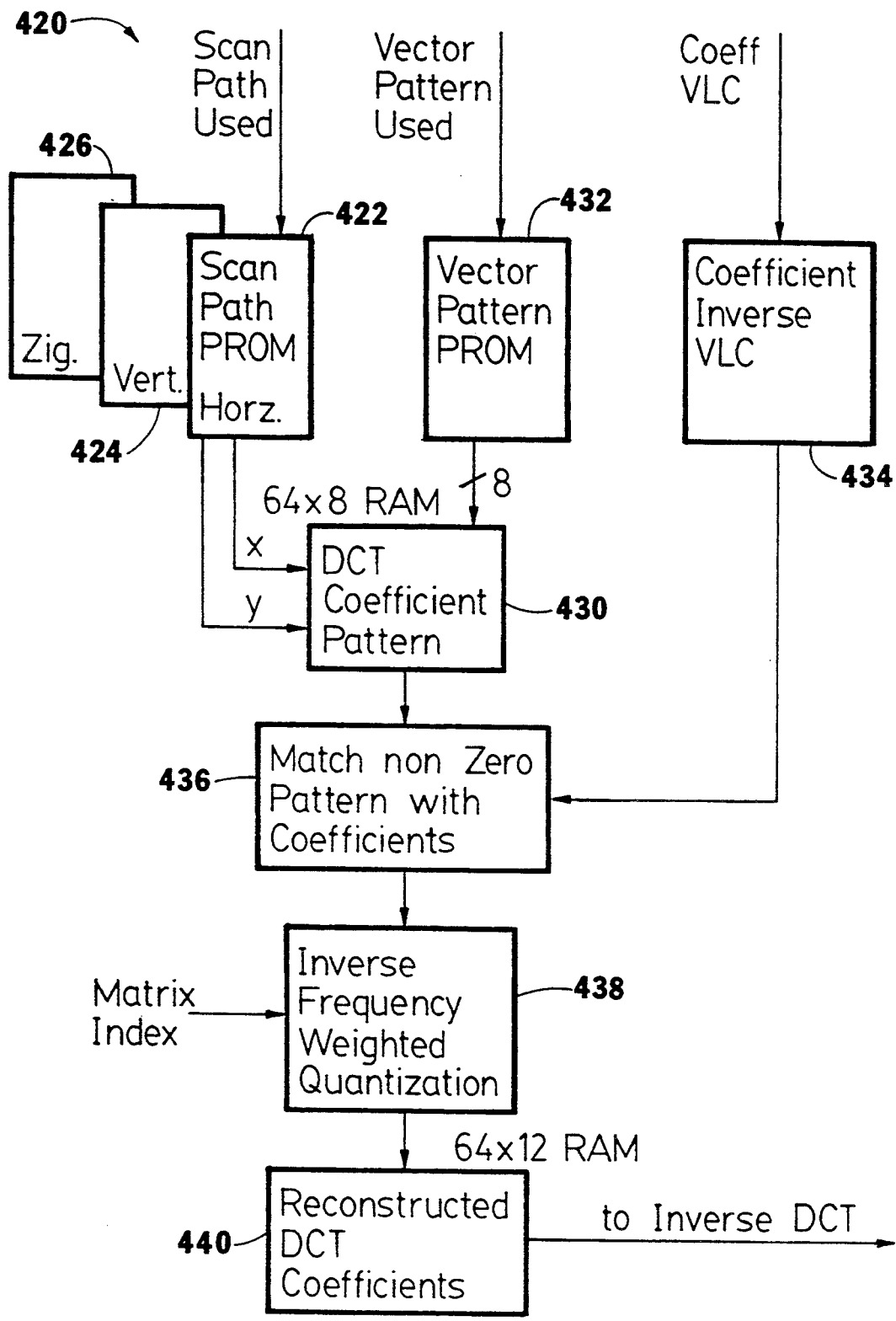
fig.—14.

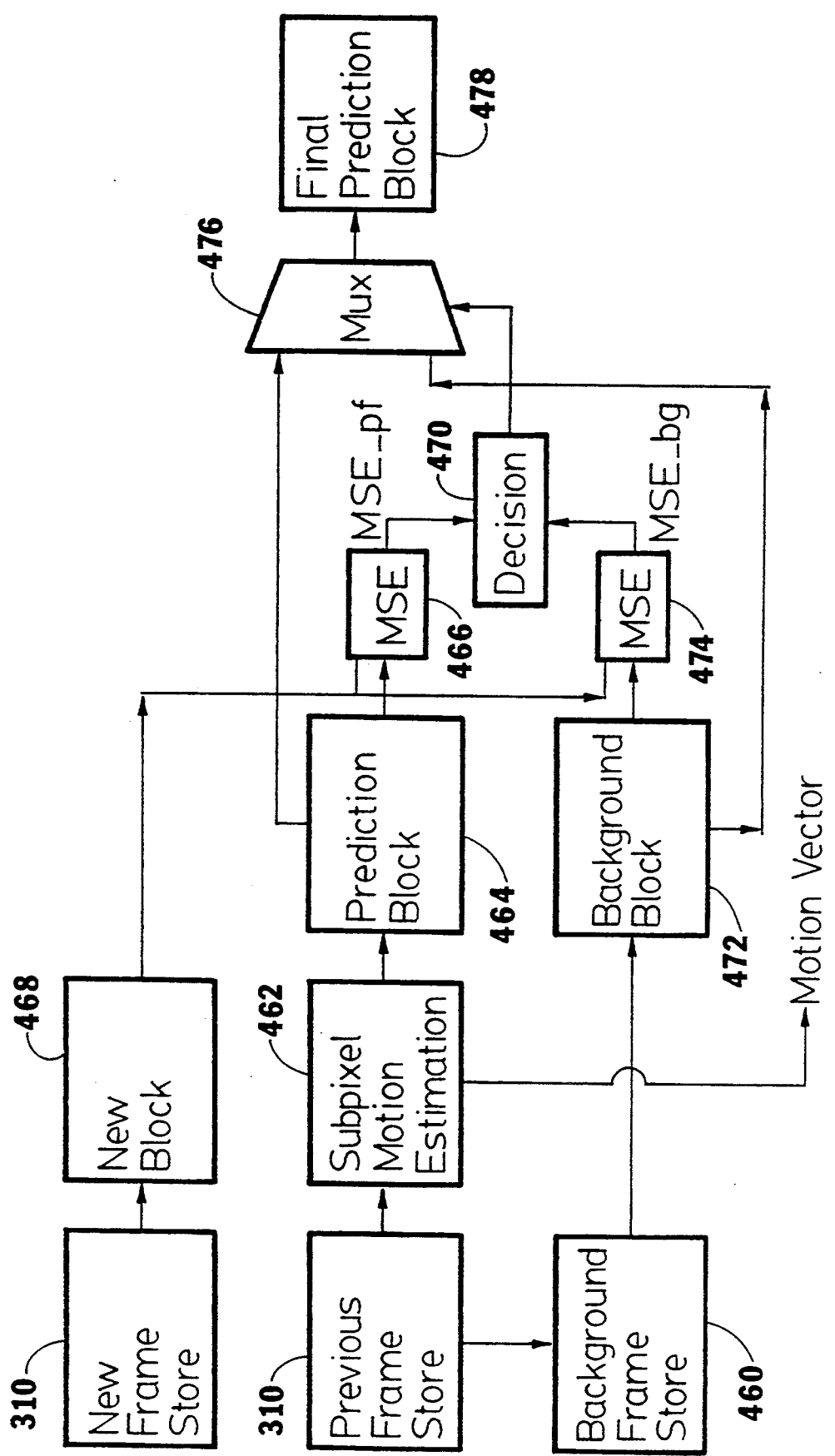
fig._15.

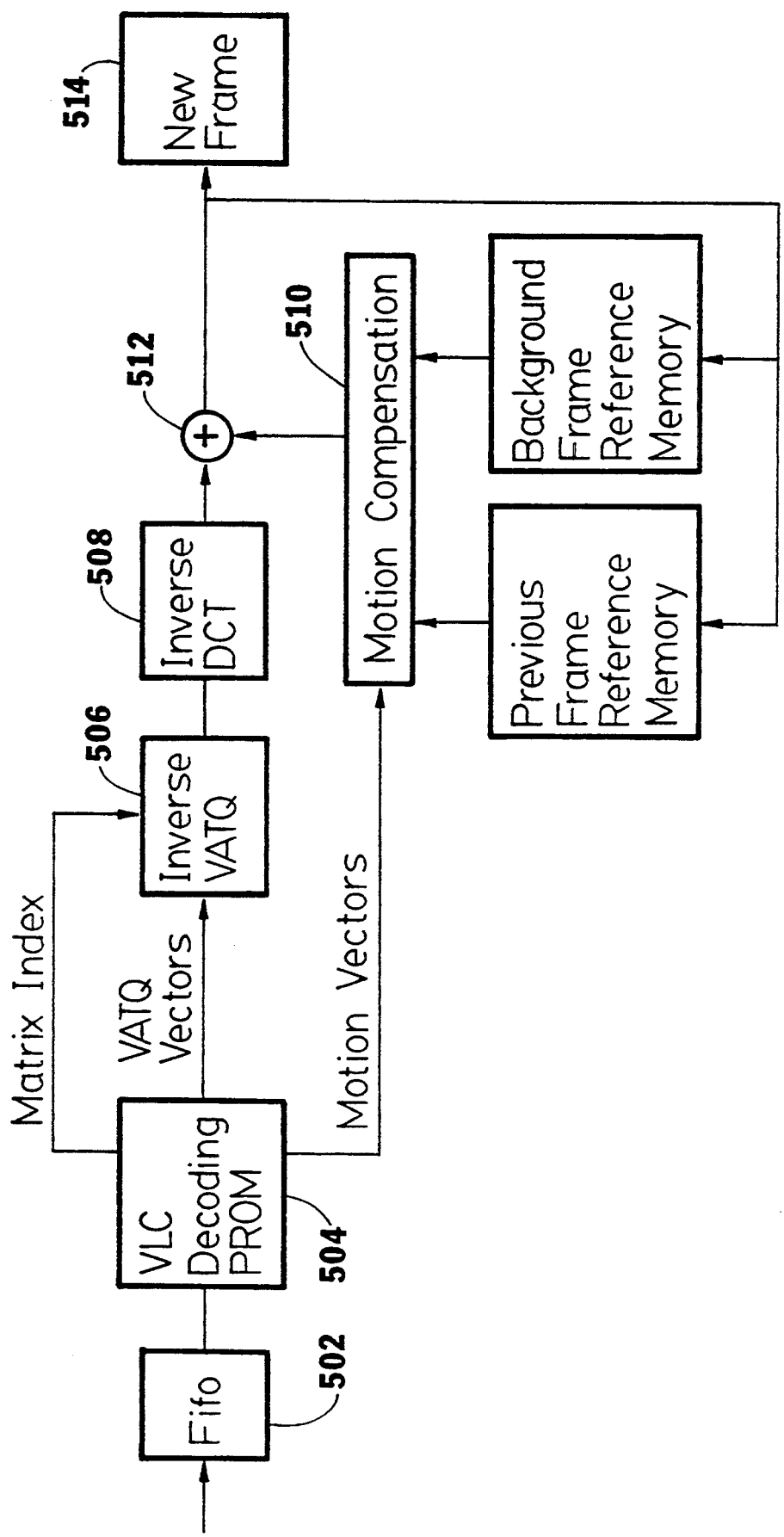
fig.—16.

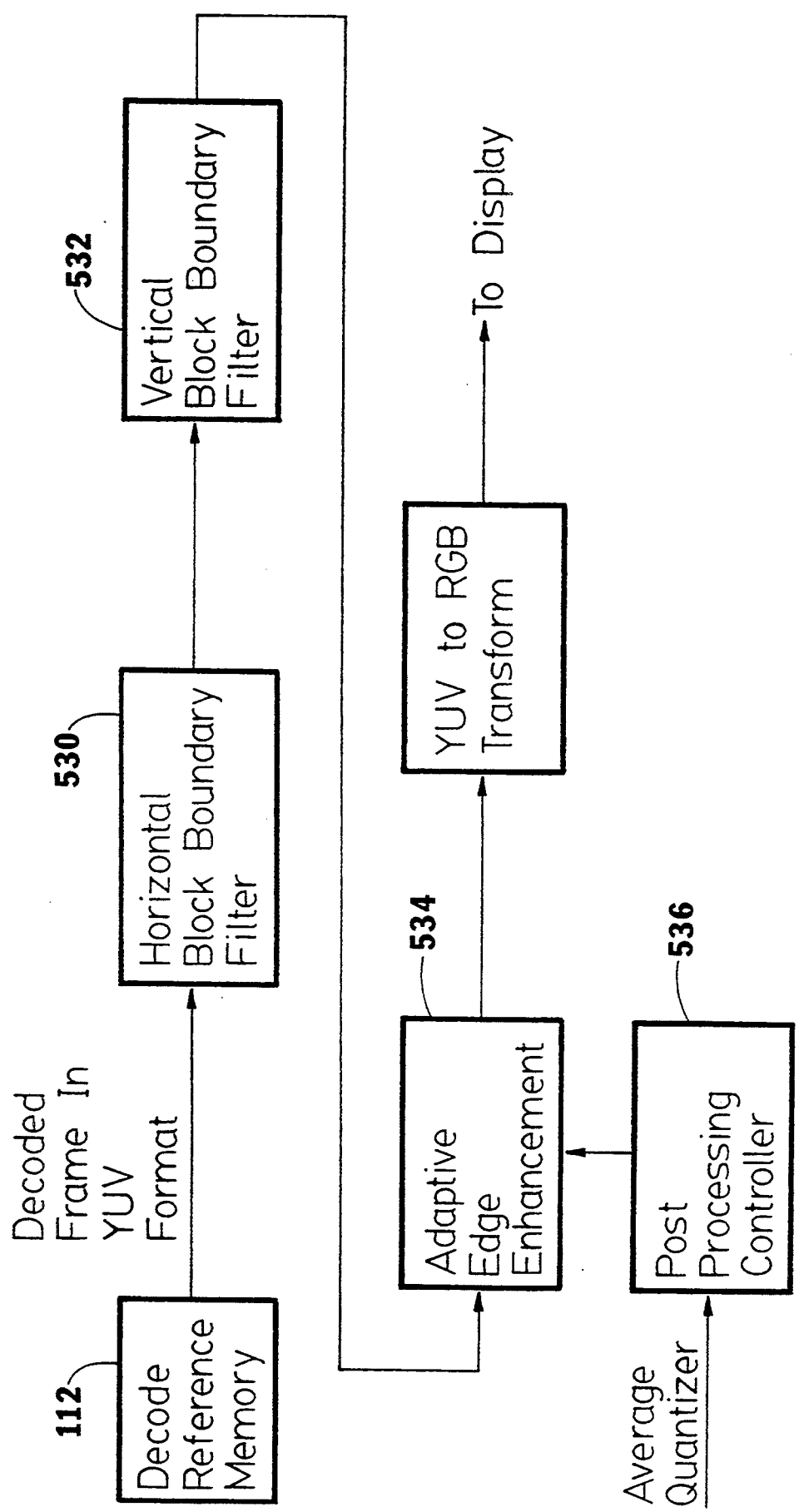
fig._17.

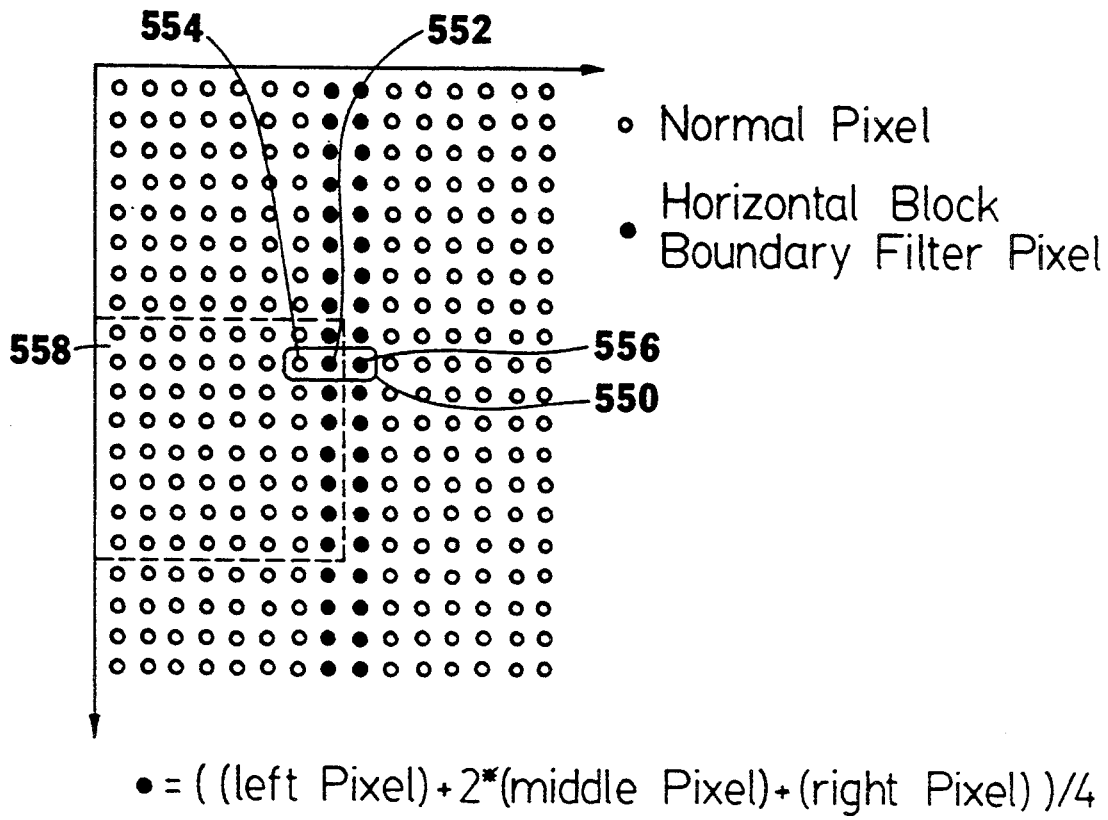
• = ( (left Pixel)+2*(middle Pixel)+(right Pixel) )/4
fig.—18.
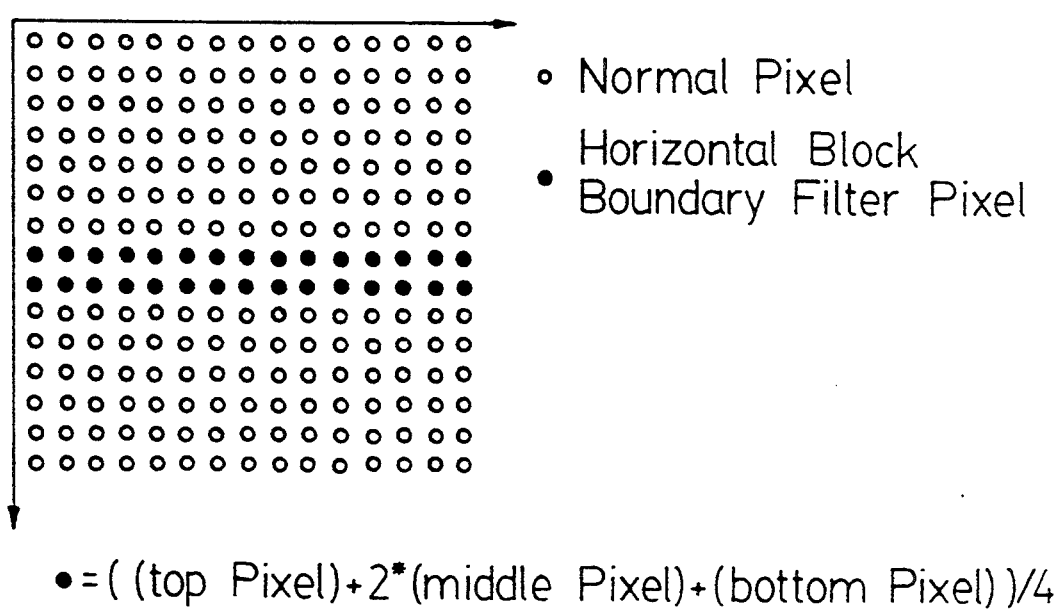
• = ( (top Pixel)+2*(middle Pixel)+(bottom Pixel) )/4
fig.—19.

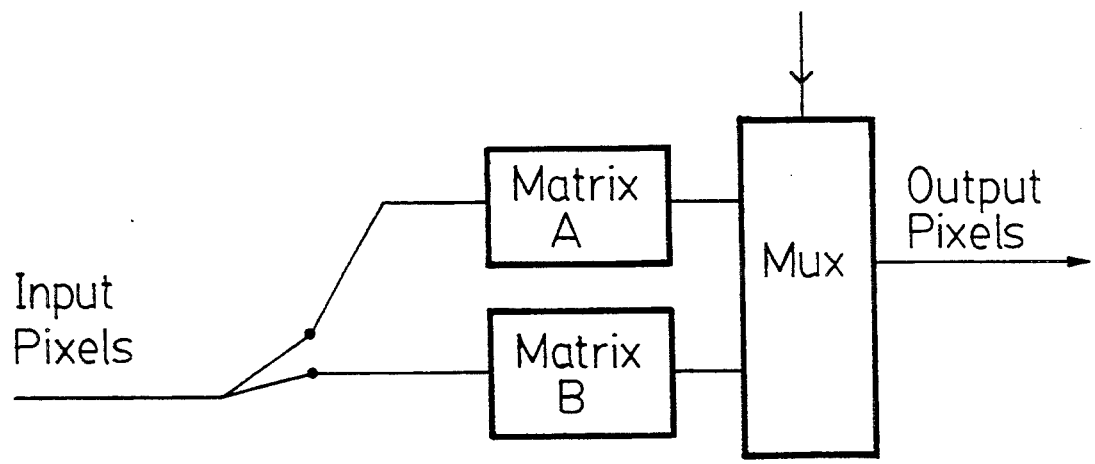
2-Dimensional
Matrix
Convolution
fig.—20.
Matrix A:    $\begin{vmatrix} 0 & -1 & -2 & -1 & 0 \\ -1 & 1 & 4 & 1 & -1 \\ -2 & 4 & 12 & 4 & -2 \\ -1 & 1 & 4 & 1 & -1 \\ 0 & -1 & -2 & -1 & 0 \end{vmatrix}$  / 16
Matrix B:    $\begin{vmatrix} -1 & -3 & -3 & -1 \\ -3 & 15 & 15 & -3 \\ -3 & 15 & 15 & -3 \\ -1 & -3 & -3 & -1 \end{vmatrix}$  / 32
fig.—21.

DIGITAL VIDEO COMPRESSION SYSTEM UTILIZING VECTOR ADAPTIVE TRANSFORM

RELATED APPLICATION

This application is related to the application entitled "SYSTEM AND METHOD FOR AUDIO, VIDEO AND DATA CONFERENCING," Ser. No. 923,329 filed Jul. 31, 1992, hereinafter referred to as the "Related Application," which is incorporated herein in its entirety by reference.

BACKGROUND OF THE INVENTION

This invention relates in general to encoding and decoding of video information, and in particular, to a video compression system employing vector adaptive transform techniques that enables full-duplex transmission of video over ordinary analog telephone (POTS) lines.

Presently, commercially available modems readily allow a maximum of 14.4 Kbps (Kilobits per second) of data to be transmitted over a regular telephone (POTS) line. Existing video compression systems employed for encoding and transmitting video over digital channels (such as T1 or ISDN) require much higher bandwidth (i.e., 56 Kbps or higher). Therefore, conventional compression systems cannot be used for encoding and transmitting video over POTS lines. For this reason, dedicated and special channels must be used for existing video compression systems. The use of special and dedicated channels is expensive. It is therefore desirable to provide an improved video compression system for encoding and transmitting video information which can transmit full-duplex full-motion color video information over ordinary telephone lines.

In the Related Application, a system and method for audio, video and data conferencing is proposed which enables audio, video and computer data to be transmitted over a POTS line. In such system, bandwidth allocation for each type of data is dynamically and adaptively dependent on the amount of data present, pre-assigned priority and predetermined bandwidth requirements. In the preferred embodiment of the Related Application, audio, computer and video data conferencing between interlinked computer systems favor assigning top priority to audio followed by computer and then video data. Concurrent audio, computer and video data conferencing can be communicated over a regular POTS link. The video compression system and method of this invention will work in the context of the concept of the Related Application for transmitting video data over a POTS line.

In many of the existing video compression systems, a fixed bandwidth is allocated to video information. One of the key concerns in such existing systems is to apply video compression so that the video information transmitted can fit within such fixed bandwidth. A spatial domain to transform domain transformation is first performed and the transform video information is stored in a rate buffer in such video compression system. In order to ensure that appropriate video compression is applied, such system employs rate buffer capacity control feedback to control the compression so that the data is transferred out from the rate buffer at a synchronous rate.

In the preferred embodiment of the Related Application, however, video information is assigned the lowest priority so that the bandwidth allocated to video information may vary from the entire bandwidth available to none at all. Therefore, the above-described conventional video compression system cannot be used in the context of this system described in the Related Application. Therefore, it is desirable to provide an improved video compression system that can accommodate variable bandwidth allocated to video.

SUMMARY OF THE INVENTION

As indicated above, in the preferred embodiment of the Related Application, audio information has the highest priority, computer data the second priority, and video information the last priority. Therefore, the transmission of video information can be stopped completely when necessary. Such system design calls for video compression which is different from the above-described conventional video compression scheme. The video compression system of this invention employs look-ahead bit allocation rate buffer control where the data is transferred out of the rate buffer at an asynchronous rate so that the numbers of bits allocated and subsequently generated for coding a block may be and are usually different from those for coding another block.

The video compression system of this invention comprises three sections. The first preprocessing section employs a median decimation filter which combines median filtering and a decimation process. An adaptive temporal filter and a content adaptive noise reduction filter are employed to provide images with proper smoothness and sharpness to match the coder/decoder ("codec") characteristics.

The second section employs a two pass look-ahead bit allocation rate buffer control scheme. Since the bandwidth available may differ from frame to frame, the video compression system of this application first checks the number of bits available for a particular frame, and allocates a number of bits to the encoding of video information in each block within the frame in the first pass. In the second pass, the actual number of bits generated for each block is made to depend on the number of bits allocated to the encoding of one or more blocks different from the one being encoded, such as the number of bits allocated to the subsequent encoding of another block in a look-ahead scheme. In the preferred embodiment, the number of bits generated for each block is made to depend on the difference between the number of bits allocated to all of the preceding blocks of the same frame and the number of bits actually generated for all such blocks. This system also makes the best use of the bandwidth available so that satisfactory video images may be encoded and transmitted despite the limited bandwidth of the POTS line.

In the preferred embodiment, vector coding is employed which takes advantage of low-bit rate coding by fully exploiting their characteristics of quantized discrete cosine transform ("DCT") coefficients. In such embodiment, first quantized DCT coefficients are scanned using three different modules, and the one providing the most compact path is chosen. Then each scan vector is divided into eight zones and variable length coding provides a much better way than conventional straight run-length coding. Finally, in such embodiment, the all one vector module takes advantage of the low-rate coding. The second section also employs background and foreground estimation that provides much better prediction in the low bit rate environment. In addition to the motion estimation prediction provided by the H.261 standard, additional information for prediction is provided to achieve better coding gain.

The third section is a post-processing filter which reduces artifacts and enhances images. In the preferred embodiment, it first only applies filtering to the block boundary to remove blocking artifacts. Then, subject to the image characteristic (the average quantization index), different kinds of filtering are applied to enhance the images.

One aspect of the invention is directed towards a method for encoding a time sequence of frames of digitized video information, where the frames are divided into blocks and where number of bits available for encoding video information change over time so that the number of bits available for encoding a frame may differ from the number of bits available for encoding a subsequent frame in the time sequence. The method comprises performing a spatial domain to transform domain transformation of video information related to each block of a frame to obtain a corresponding block of transform coefficients. The method also includes ascertaining the number of bits available for encoding the frame, allocating a number of bits to the encoding of each block of transform coefficients for all the blocks in said frame, and quantizing and coding each block of transform coefficients to generate variable length coding bits for each block. The number of bits generated for each block is a function of the number of bits allocated to the encoding of a different block. In the preferred method, prior to quantizing and coding a block of transform coefficients, the number of bits generated in quantizing and coding all of the blocks of transform coefficients that precedes such block in the time sequence is first determined. The step of quantizing such block of transform coefficients then uses information regarding the sum total number of bits allocated to all the blocks of the frame that have been quantized and coded up to such quantizing step, and the number of bits generated in quantizing and coding all of the preceding blocks of transform coefficients. These two quantities are used at such quantizing step to generate the number of variable length coding bits for such block.

To further improve the efficiency of coding and the quality of the video transmitted, a number of coding techniques is used. Another aspect of the invention is directed towards a method for encoding frames of digitized video information, where the frames are divided into blocks. The method comprises performing a spatial domain to transform domain transformation of video information related to each block of a frame to obtain a corresponding block of transform coefficients, and quantizing and coding each block of transform coefficients to generate variable length coding bits for each block. The coding step includes first scanning at least some of the coefficients of each block along at least two different paths and counting the number of nonzero coefficients along each path to obtain at least two numbers. The numbers are then compared to obtain the largest of the numbers and the coefficients of each block are then scanned along the path that results in the largest number before each block is coded. In the preferred embodiment, three scan paths are used: horizontal, zigzag and vertical scan paths.

Yet another aspect of the invention concerning coding is directed towards a method for encoding frames of digitized video information, where the frames are divided into blocks. The method includes performing a spatial domain to transform domain transformation of video information related to each block of a frame to obtain a corresponding block of transform coefficients, and quantizing and coding each block of transform coefficients to generate variable length coding bits for each block. Each block is then divided into two or more different sets of zones. A scan vector is then formed from coefficients in at least one zone and variable length coding is then performed on the coefficients of said at least one zone.

To improve the smoothness and sharpness of the video images, pre-processing is performed. Thus, another aspect of the invention is directed towards a method for decimating and filtering video information in a two-dimensional array of pixel values forming a frame, said array being arranged in horizontal rows and vertical columns. The method comprises multiplying each pixel value in a group of three adjacent pixel values in each row or column of said array by a predetermined factor to obtain three products. The three products are then summed to obtain a new pixel value to replace the group of three adjacent pixel values, thereby filtering and decimating the frame by three in the horizontal or vertical direction. In the preferred embodiment, the median one of the three pixel values is multiplied by a factor that is about twice that for multiplying the other two pixel values.

Post-processing is also performed to further improve the quality of the video. Another aspect of the invention is directed towards a method for filtering a frame of video information, where the frame includes a two-dimensional array of pixel values. The array is grouped in blocks of pixel values, each block having a boundary and boundary pixel values at its boundary, said boundary pixel values being adjacent to the boundary pixel values of adjacent blocks in the array. The method comprises detecting at least one boundary pixel value and at least two pixel values that are adjacent to such pixel value and that are not boundary pixel values of the same block, said each boundary pixel value and said at least two pixel values forming a group. Such boundary pixel value and at least two pixel values that are adjacent to such boundary pixel value and that are not boundary pixel values of the same block as such boundary pixel value are multiplied by predetermined factors to obtain products. The products are then summed to obtain a new pixel value corresponding to such boundary pixel value and said at least one boundary pixel value is replaced by its corresponding new pixel value.

Yet another aspect of the invention concerning post-processing is directed towards a method for encoding frames of pixel values of video information, where the frames are divided into blocks. The method comprises performing a spatial domain to transform domain transformation of video information related to each block of a frame to obtain a corresponding block of transform coefficients. Each block of transformed coefficients is then quantized and coded to generate variable length coding bits for each block. The quantizing step is performed by reference to one index within a set of numerical indices indicating number of bits resulting from the quantizing step. The indices have values that vary directly with the number of bits resulting from the quantizing step. The method further comprises computing an average value of the indices by reference to which the blocks of a frame have been quantized and coded in the quantizing and coding step, comparing said average value to predetermined range values and multiplying each pixel value by a selected matrix element when the average value is within predetermined range values.

BRIEF DESCRIPTION OF THE DRAWINGS

FIG. 1 is a block diagram of the overall video encoding and decoding system.

FIG. 2 is a block diagram of the pre-processing section of FIG. 1.

FIG. 3 is a block diagram of a median decimation filter in the pre-processor section of FIG. 2.

FIG. 4 is a schematic circuit diagram of a horizontal decimation filter in the pre-processing section of FIG. 2.

FIG. 5 is a block diagram of an adaptive temporal filter in the pre-processing section of FIG. 2.

FIG. 6 is a block diagram of a content adaptive noise-reduction filter in the pre-processing section of FIG. 2.

FIG. 7 is a block diagram of an encoder to illustrate the invention.

FIG. 8 is a block diagram of an inner spatial and temporal filter in the encoder of FIG. 7.

FIG. 9 is a block diagram to illustrate the vector adaptive transform quantization (VATQ) function of the encoder of FIG. 7.

FIG. 10A is a block diagram of the frequency weighted quantization circuit of FIG. 9.

FIG. 10B is a graphical illustration of a matrix index transfer function used in the quantization circuit of FIG. 10A.

FIG. 11A is a block diagram of a system for determining coefficient scan path in the system of FIG. 9.

FIGS. 11B, 11C, 11D are schematic views of an 8 by 8 block of DCT coefficients to illustrate three different scan paths.

FIG. 12 is a functional block diagram of a circuit for implementing the system of FIG. 11A.

FIG. 13 is a functional block diagram of a circuit for implementing the vector mapping function of FIG. 9.

FIG. 14 is a functional block diagram of a system for implementing the inverse vector mapping function of FIG. 7.

FIG. 15 is a block diagram of a circuit for implementing the background/foreground and motion estimation function of FIG. 7.

FIG. 16 is a functional block diagram of a decoder to illustrate one implementation of the invention in FIG. 1.

FIG. 17 is a functional block diagram of a post-processing system to illustrate the invention.

FIG. 18 is a schematic illustration of a portion of a video frame to illustrate the operation of a horizontal block boundary filter of FIG. 17.

FIG. 19 is a schematic illustration of a portion of a video frame to illustrate the operation of a vertical block boundary filter of FIG. 17.

FIG. 20 is a block diagram of a system illustrating the adaptive edge enhancement function of FIG. 17.

FIG. 21 illustrates two adaptive edge enhancement matrices that may be used in the adaptive edge enhancement function of FIG. 20.

DETAILED DESCRIPTION OF THE PREFERRED EMBODIMENT

FIG. 1 is a block diagram illustrating an overall video system suitable for compressing the video information, transmitting the compressed video information over a communication link such as a POTS line, and then expanding the compressed information in the decoder. Typically, the video information originates from a source such as a video camera (not shown) and is pre-processed in pre-processing module 102, which filters, smooths, and enhances the video sequences to prepare images of proper size and characteristics to match the encoder. The pre-processed video sequences are stored in encode reference memory 104.

The pre-processed video sequences are then further processed by the encoder 106 which removes most of the redundance and compresses the video for transmission over a modem through a communication link such as a POTS line 108 to a decoder 110. The decoder performs the inverse operation of the encoder to reconstruct the image from a compressed bit stream and stores the decoded image from a compressed bit stream and stores the decoded image in decode reference memory 112. The decoded image is then processed by the post-processing module 114 which removes compression artifacts and enhances the image. The image is then ready to be displayed by a display device. Both the encode and decode reference memories 104, 112 store the current and previous video frames for encoding and decoding.

FIG. 2 is a functional block diagram of system for implementing a pre-processing function of FIG. 1. As shown in FIG. 2, the video frames are first filtered and decimated by horizontal median decimation filter 122, further decimated by horizontal decimation filter 124, and filtered by adaptive temporal filter 126 and by content adaptive noise-reduction filter 130. Both the adaptive temporal filter and the content adaptive noise-reduction filter require information from previous frames which are stored in frame store 128. The output of filter 130 is then filtered by windowed background noise-reduction filter 132, and further decimated by vertical decimation filter 134 and stored in encode reference memory 104.

FIG. 3 is a block diagram of one embodiment of the median decimation filter of FIG. 2. In the description below, it is assumed that the video frame input has 640 columns and 240 rows of pixels, although obviously the invention is not limited to such frame size. The horizontal median decimation filter decimates the video frame by three horizontally to reduce the frame size to 213 columns by 240 rows approximately. Filter 122 decimates the video frame horizontally using a 1-2-1 filter. In operation, if the video frames are in the raster format, three pixel values on the same row are shifted through the three delay elements 152, 154, 156 in three clock cycles. The outputs of the three delay elements are applied to a logic circuit 160 to find, from the three pixel values at the outputs of delay elements 152, 154, 156, the pixel value that is the median value (less than one pixel value but greater than the other pixel value). Logic circuit 160 may be implemented using comparators in a manner known to those skilled in the art.

As shown in FIG. 3, the median value output from block 160 is multiplied by two by multiplier 162 and the product is summed with the outputs of delay elements 152, 156 by adder 164 and the sum is shifted two places to the right to divide the sum by four in shifter 166 to provide an output 168. Mathematically, the output pixel O(i) at 168 can be computed in equation (1) as:

$$O(i) = [I(i-1) + 2 \cdot \text{median}(I(i-1), I(i), I(i+1)) + I(i+1)]/4 \quad (1)$$

where i is the pixel index, I(i−1), I(i), I(i+1) are the three input pixels, and the function median (x, y, z) returns the median value of x, y, z.

Output 168 is clocked at a clock rate which is one third of the raster clock for the video frame at the input of filter 122. FIG. 4 is a schematic circuit diagram illustrating a conventional horizontal decimation filter 124 used in the pre-processing circuit of FIG. 2. Instead of horizontal decimation as in filter 122, it is also possible to implement a similar vertical decimation. If the video is processed in the raster format, two line buffers will be needed for storing two prior rows of pixel values to implement vertical decimation.

FIG. 5 is a block diagram of a circuit illustrating the adaptive temporal filter 126 of FIG. 2. Filter 126 smooths out rapid transitions between the frames by applying infinite impulse response filtering in the temporal dimension. The coefficients of this filter are fixed and derived from experimental results. The constants Tf-Factor, Tf-Thresh-Lo and Tf-Thresh-Hi are derived from experiments and have the following values in the preferred embodiment: 0.8, 3 and 8 respectively.

In the preferred embodiment, the pre-processing section described herein is implemented in a pipeline design where the video information is processed on a frame-by-frame basis. The pixels in each frame are labeled sequentially by a pixel index i. Thus, the ith pixel in the new or current frame, NF(i), and the ith pixel in the old frame, OFS(i), both refer to the same pixel location in the new and old frames. Filter 126 derives the temporal difference of the ith pixel, TD(i), as given by NF(i)−OFS(i). In order to filter such temporal difference, it is multiplied by a factor to obtain a low-pass filtered signal LPF(i) given by TD(i)*TF-Factor where Tf-Factor is the multiplier.

Thus, in reference to FIG. 5, adder 180 derives the temporal difference and applies this quantity to multiplexer 182. The temporal difference is multiplied by Tf-Factor by multiplier 184 to obtain the low-pass filtered signal LPF(i) and the product also applied to multiplexer 182. The temporal difference and the low-pass filtered signal LPF(i) are summed by adder 186 and divided by two by means of shifter 188, and the output applied also to multiplexer 182. One of the three inputs to multiplexer 182 is selected as the output, Delta, in accordance with a command from decision block 190 which may be implemented in ASIC or other programmable logic circuits such as programmable array logic (PAL). Absolute value circuit 192 derives the absolute value of the temporal difference, ABSTD(i), where such absolute value is also applied as an output of filter 126 to the decision block 210 of filter 130 of FIG. 6. The decision block 190 derives a command signal to be sent to multiplexer 182 with the aid of comparators 194, 196 in accordance with the following equations (2):

$$\text{Delta}=\text{LPF}(i), \text{ if ABSTD}(i) > \text{Tf-Thresh-Hi} \quad (2)$$
$$\text{Delta}=\text{TD}(i), \text{ if ABSTD}(i) < \text{Tf-Thresh-Hi and}$$
$$\text{ABSTD}(i) > \text{Tf-Thresh-Lo}$$
$$\text{Delta}=(\text{TD}(i)+\text{LPF}(i))/2, \text{ if none of the above}$$

In equations 2 above, the two thresholds Tf-Thresh-Lo and Tf-Thresh-Hi are constants applied to one of the inputs of comparators 194, 196 as shown in FIG. 5.

The output of filter 126 is obtained by adding Delta to the old frame pixel OFS(i) using adder 198. This output is then supplied (not shown) to frame store 128 to replace NF(i) as the new frame for the next stage in the pre-processing system. After the entire new or current frame has been processed by the pre-processing section of FIG. 2, the new frame then replaces the old frame as the old frame during the processing of the next frame.

Content adaptive noise-reduction filter 130 filters the new frame output from filter 126 in a manner that smooths out high frequency spatial noise in the image by examining the high frequency difference between each pixel and its low-pass filtered results. It also smooths out rapid transition between frames by applying a spatial filter to each pixel that differs from the same pixel of the last frame by using a non-linear transfer function. The absolute value of the temporal difference ABSTD(i) is supplied to filter 130 by the temporal filter 126.

A spatial filter 200 is employed. Since the frame is still processed in the raster format, the pixel immediately adjacent to pixel i in the row of pixels scanned before the row for pixel i has the index (i−width), where width is the number of pixels in a row of the frame. Similarly, the immediately adjacent pixel in the subsequent row to the row containing the i pixel is indexed (i+width). Therefore, when the spatial filter 200 is applied to pixel i, the low-pass filtered signal SLPF(i) is computed as:

$$SLPF(i)=[NF(i-\text{width}-1)+2*NF(i-\text{width})+NF(i-\text{width}+1)+2*NF(i-1)+4*NF(i)+2*NF(i+1)+NF(i+\text{width}-1)+2*NF(i+\text{width})+NF(i+\text{width}+1)]/16 \quad (3)$$

Let the spatial difference ABSSD(i)=ABS(NF(i)−SLPF(i)). The output of the Content Adaptive Noise-Reduction Filter, Output(i), is based on the following decision logic:

$$\begin{aligned}&\text{Output}(i)=\text{SLPF}(i) \text{ if ABSTD}(i) > \text{Hi-T-Threshold or} \\ &\qquad \text{ABSSD}(i) > \text{Hi-S-Threshold} \\ &\text{Output}(i)=\text{NF}(i) \text{ if ABSTD}(i) < \text{Lo-T-Threshold and} \\ &\qquad \text{ABSSD}(i) < \text{Lo-S-Threshold} \\ &\text{Output}(i)=[\text{SLPF}(i)+\text{NF}(i)]/2, \text{ if otherwise.}\end{aligned} \quad (4)$$

The values Hi-T-Threshold, Hi-S-Threshold, Lo-T-Threshold and Lo-S-Threshold are constants derived from experiments and have the following values in the preferred embodiment: 10, 30, 3, 15.

In equations 4 above, spatial filter 200 may be implemented in a manner known to those skilled in the art employing at least two line buffers for storing two additional rows of pixel values for deriving the low-pass filtered signal SLPF(i) from three lines or rows of inputs in accordance with equation 3 above. Adder 202 and absolute value circuit 204 cooperate to derive the spatial difference ABSSD(i). Adder 206 and one bit shifter 208 cooperate to derive the average of the input and the low-pass filtered result indicated in equation 4 above. Decision block 210 implements equations 4 above to derive a command signal applied to multiplexer 212 which selects one of the three inputs to be its outputs. Decision block 210 may be implemented in ASIC such as field programmable gate arrays (FPGA) or other programmable logic circuits such as PAL.

The output of filter 130 is further processed by windowed background noise-reduction filter 132. This filter first segments the image into two regions. The user defined region can be any shape or size; it can cover the entire image or none of the image. For those pixel outside of the user defined region in the image, each pixel will be low-pass filtered by a spatial filter if the high-frequency energy y of that pixel is high.

The decision rule is as follows:

Given each pixel from the filtered NF(i) and the old frame store OFS(i), the Windowed Background Noise Reduction filter first derives the spatial low-passed filtered signal SLPF(i) is computed as:

$$SLPF(i) = (NF[i-\text{width}-1] + 2*NF[i-\text{width}] + NF[i-\text{width}+1] + 2*NF[i-1] + 4*NF[i] + 2*NF[i+1] + NF[i+\text{width}-1] + 2*NF[i+\text{width}] + NF[i+\text{width}+1])/16. \quad (5)$$

Let the spatial difference ABSSD(i)=ABS(NF(i)−SPLF(i)). Given each pixel from the filtered NF(i) and the old frame store OFS(i), the Windowed Background Noise Reduction filter, Output(i) is based on the following decision logic:

if the pixel is in the background region, $$\begin{aligned}&\text{Output(i)} = \text{SLPF(i)} \text{ if ABSTD(i)} > \text{Hi-B-Threshold} \\ &\text{Output(i)} = \text{NF(i)} \text{ if ABSTD(i)} < \text{Lo-B-Threshold} \\ &\text{Output(i)} = (\text{SLPF(i)} + \text{NF(i)})/2, \text{ if otherwise.}\end{aligned} \quad (6)$$

The values Hi-B-Threshold, Lo-B-Threshold and Lo-S-Threshold are constants derived from experiments and have the following values in the preferred embodiment: 20, 10 and 15 respectively.

It will be noted that equation 5 is the same as equation 3 above, it being noted that the filtered frame NF(i) in equation 5 is the filtered output of filter 130.

Lastly, the output of filter 132 is decimated vertically by vertical decimation filter 134 employing a standard 1-2-1 filter to reduce the image from 240 rows or lines of pixels to 80 lines.

Encoder

The vector adaptive transform processing encoder 300 will now be described by reference to FIG. 7. The encoder differs from the pre-processing and post-processing sections in that, instead of processing on a frame-by-frame basis, the pipeline design of the encoder allows for filtering block by block, and so is the processing in the decoder as well. Thus, in the description for the encoder and decoder, the pixel index i will refer to pixels in the block instead of frame. As shown in FIG. 7, for each pixel from a new block, adder 302 subtracts it from a corresponding pixel from the prediction block from background/foreground and motion estimation circuit 304 to obtain a temporal difference TD(i)', where the difference block is filtered by spatial and temporal inner filter 306. Filter 306 is very similar in design to the content adaptive noise-reduction filter 130 of the pre-processing section of FIG. 2. Thus, the circuit of FIG. 8 implements the following equations in a manner substantially similar to that described above for filter 130.

Low passed filtered signal is defined by:

$$SLPF(i)' = (TD[i-\text{width}-1]' + 2*TD[i-\text{width}]' + TD[i-\text{width}+1]' + 2*TD[i-1]' + 4*TD[i]' + 2*TD[i+1]' + TD[i+\text{width}-1]' + 2*TD[i+\text{width}]' + TD[i+\text{width}+1]')/16,$$

and $$ABSTD(i)' = ABS(TD(i)'). \quad (7)$$

Let the spatial difference ABSSD(i)'=ABS(TD(i)'−SLPF(i)'). The output denoted as E(i), is based on the following decision logic:

$$E(i) = \text{Tf\_coeff}*\text{Delta}'$$

where $$\begin{aligned}&\text{Delta}' = \text{SLPF(i)}', \text{ if ABSTD(i)}' > \text{Hi-T-Threshold or} \\ &\qquad\qquad\qquad\qquad \text{ABSSD(i)}' > \text{Hi-S-Threshold} \\ &\text{Delta}' = \text{TD(i)}, \text{ if ABSTD(i)}' < \text{Lo-T-Threshold and} \\ &\qquad\qquad\qquad\qquad \text{ABSSD(i)} < \text{Lo-S-Threshold} \\ &\text{Delta}' = (\text{TD(i)}' + \text{SLPF(i)}')/2, \text{ if none of the above}\end{aligned} \quad (8)$$

The values Hi-T-Threshold, Hi-S-Threshold, Lo-T-Threshold, Lo-S-Threshold, and Tf_coeff are constants derived from experiments and have the following values: 15, 50, 3, 20 and 0.85 respectively.

The filtered block E is then transformed from spatial domain to transform domain by a conventional discrete cosine transform (DCT) block 308 into a corresponding block of equal size of transform coefficients. For simplicity, it is assumed that the blocks has sixty-four temporal difference values arranged in an 8×8 array so that the output of block 308 is also an 8×8 array of transform coefficients.

The two pass look-ahead bit allocation scheme of the codec accomodates the variable frame bit rate of the system of the Related Application. The two pass implementation of the invention of this application also maximizes the limited bandwidth allocated to the video information despite severe limits imposed by the limited bandwidth. In the first pass, given the number of bits available for a particular frame the number of bits allocated to each block is first estimated.

As discussed in the Related Application, the bandwidth allocated to video data can be varied dynamically depending on the priority assigned to audio, computer data and video and to the relative quantity of data in each of the three types that has been sent. The video information supplied to the overall video system 100 of FIG. 1 is usually in the form of a time sequence of video frames which may be in the raster format. As the bandwidth assigned to video changes over time, the number of bits that is allocated to encode a frame also changes with time so that the number of bits available for coding one frame may be different from that available for coding a subsequent frame in the sequence. Therefore, in the two pass configuration envisioned by this invention, after the DCT transform performed by block 308, the number of bits available for encoding the current frame is first ascertained, from the controller (not shown) of the audio, video and data conferencing system (controller 460 in FIG. 1 of the Related Application). The two pass configuration of this invention results in a variable asynchronous compressed video data rate and preferably employs a bit allocation scheme referred to below as look-ahead bit allocation scheme. As a consequence of this scheme, the numbers of bits allocated and subsequently generated for encoding a block may be and are usually different from those for encoding another block.

First, the means square error (MSE) of block i compared to the same block in the previous frame is computed to obtain the quantity MSEi. Both the current frame and the previous frame are stored in frame store 310. Block i and the same block in the previous frame are obtained from store 310 and the quantity MSEi computed. The mean square errors for all the blocks are then summed to obtain the total mean square error (TMSE) for the entire frame. Then the number of bits allocated to a particular block in the frame is given by the ratio of the mean square error for such block to the total mean square error for the entire frame (MSEi/TMSE) times the total number of bits FB assigned for encoding the frame; the number of bits assigned to block i being referred to as Bi. If B-allocated(i) is the total number of the assigned bits to all of the blocks up to and including block i but not the next block i+1, and B-gen(i) is the actual number of bits generated in the coding process to be described below for the same blocks up to and including block i, the difference between these two quantities will indicate whether too many bits have been used in the coding process up to this point so that one has to budget the remaining bits more frugally or that the bits available have been underutilized so that more bits will now be available for coding future blocks. The difference between these two quantities B-diff(i) is fed back to control the status of the quantizer within the vector adaptive transform quantizing block 312 for the quantization of the next block i+1. The actual total number of bits generated from the coding process up to and including block i is monitored by means of rate buffer 314 and this number is fed back to the VATQ block 312 for adaptive quantization. Feeding back of the quantity B-gen(i), the adaptive quantization and coding by 312 form the second pass of the two pass quantization and coding scheme of this invention.

During the first pass, the calculation of the mean square error of each block and the sum total mean square error for the frame and a number of bits assigned to each block may be performed by a digital signal processor (DSP) 316, where the data bus and control bus connecting DSP 316 to the other blocks of encoder 300 have been omitted for simplicity. Alternatively, a logic circuit labeled as BIT ALLOC 318 may be employed instead to perform this specialized function and apply the number of bits allocated Bi to the block to the VATQ block 312, where again the signal buses connecting circuit 318 and other circuit blocks have been omitted in FIG. 7 for simplicity.

Block 312 quantizes and codes the DCT coefficients into a bit stream that is applied to multiplexer 320. This bit stream is multiplexed by multiplexer 320 with motion vectors from block 304 and sent to the rate buffer 314. The multiplexed bit stream combining the outputs of blocks 312 and 304 are the actual bits generated from the coding process and it is this quantity that is monitored by rate buffer 314 as B-gen(i) which is fed back to block 312.

The key here is that information from future uncoded blocks i+1, i+2, . . . , (as used in the quantity TMSE) is used to control the bit assignment of blocks 1, 2, i, . . . . . This approach of using "future information" for rate control provides much better bit allocation and overall quality improvement. First, the entire frame is evaluated and the proper number of bits is allocated to each block during the first pass. In the second pass, based on the status of the rate buffer in the actual coding process, the quantization is modified to improve the performance. The total number of bits FB allocated to the current frame can be as small as zero, or modified as desired as described in the Related Application.

The VATQ block 312 will now be described in reference to FIG. 9. Block 312 includes a frequency weighted quantization block 340 which receives as input the feedback signal B-gen(i) from rate buffer 314 and the quantity B-allocation(i) either from DSP 316 or bit allocation block 318. Frequency weighted quantization block 340 then quantizes the 64-12 bit DCT coefficients from the DCT block 308 to obtain quantized DCT coefficients.

The quantized DCT coefficients are sent to a block 342 for determining the best scanning path for the coding process as well as to three separate blocks 344, 346 and 348 for various forms of vector mapping the quantized coefficients into codes. The scan path used in the blocks 344, 346 and 348 would depend upon the scan path index provided by block 342. The outputs of blocks 344, 346 and 348 are applied to decision block 350 which selects one of the three outputs as the variable length code output of the decision block. To minimize the number of bits used in the coding, the output of the three blocks 344, 346, 348 that utilizes the smallest number of bits is chosen as the output of block 350. Block 350 is a simple logic circuit which may be implemented in a simple manner by those skilled in the art.

FIGS. 10A, 10B illustrate the structure and operation of the frequency weighted quantization block 340 of FIG. 9. A subtractor 362 subtracts the two quantities B-allocated(i) and B-gen(i) to obtain the quantity B-diff(i) which is applied to a matrix index PROM 364 which in turn applies a non-linear transfer function to derive a quantity called matrix index. One transfer function that may be used in the present embodiment is illustrated in FIG. 10B. As shown in FIG. 10B, the value of the matrix index varies from 1 to 10 with 1 indicating that there is little or no mismatch between the number of bits allocated up to and including block i and the actual number of bits generated for the blocks up to and including block i, and 10 indicating a big difference and therefore a serious mismatch. This matrix index is applied to a weighting matrix PROM 366 which stores two sets of ten 8×8 matrices where each matrix element is an 8-bit number. One set of thirty matrices is for encoding luminance information and the other set for chrominance information.

Examples of matrices stored in a lookup table in PROM 366 are shown below:

16, 16, 16, 16, 19, 19, 22, 22,
16, 16, 16, 16, 19, 19, 22, 22,
16, 16, 16, 16, 22, 22, 24, 24,
16, 16, 16, 16, 22, 22, 24, 24,
19, 19, 22, 22, 26, 26, 27, 27,
19, 19, 22, 22, 26, 26, 27, 27,
22, 22, 22, 22, 26, 26, 27, 27,
22, 22, 22, 22, 26, 26, 27, 27};
Chrominance matrix = {
16, 19, 19, 19, 32, 32, 32, 32,
19, 19, 19, 19, 32, 32, 32, 32,
19, 19, 32, 32, 38, 38, 38, 38,
19, 19, 32, 32, 38, 38, 38, 38,
32, 32, 38, 38, 38, 38, 38, 38,
32, 32, 38, 38, 38, 38, 38, 38,
38, 38, 38, 38, 42, 42, 58, 58,
38, 38, 38, 38, 42, 42, 48, 48}.

PROM 366 contains a lookup table from which one of the matrices is selected corresponding to a particular value of the matrix index. Since the matrix selected by block 366 is also an 8×8 array, for each of the 8×8 DCT coefficients Cij provided by 308, there is a corresponding matrix element Qij at the same corresponding position i, j. The DCT coefficient Cij is divided by the corresponding matrix element Qij by a divider 368 to provide each element Lij of an 8×8 array of quantized DCT coefficients, each being an 8-bit number. Buffers 372 and 374 for storing the unquantized and quantized DCT coefficients respectively may conveniently be employed in a pipeline approach to the encoder.

Conventional video compression systems employ run length coding of the DCT coefficients by scanning a block of coefficients in a predetermined path. Typically, however, the whole block is scanned at one time and is not further divided. Another aspect of the invention is directed to the feature that the block of DCT coefficients is divided into zones. In a preferred embodiment, the 8×8 block is divided into eight zones, each containing eight quantized DCT coefficients. The block may be divided into three different sets of 8 zones: horizontal, vertical or zig zag zones, each set of 8zones corresponding to and useful for horizontal, vertical or zig zag scan paths illustrated respectively in FIGS. 11B, 11C, 11D. As discussed above, the horizontal zone division will be employed in conjunction with horizontal scanning, vertical zone with vertical scanning and zig zag zoning with zig zag scanning. As shown in FIG. 11A, the quantized DCT coefficients from buffer 374 are applied to all three modules 376, 378 and 380 and all three modules scan the first zone in a corresponding zoning scheme. Thus, horizontal scan module 376 would scan the first row of eight quantized DCT coefficients as illustrated in FIG. 11B, the vertical scan module 378 the first column of the same block as shown in FIG. 11C, and zig zag scan module 380 the eight coefficients clustered at the upper left corner of the block. Note that the eight coefficients of zone 2 are shaded differently from the eight coefficients of zone 1 in FIG. 11D. Each module would add up the total number of non-zero coefficients and send such number to block 382.

It is known that in discrete cosine transform, the non-zero coefficients are usually clustered in the block so that the largest output from the three modules would indicate that zone 1 of the zoning scheme associated with one of the three scans contains more information than the zone 1 in the remaining two zoning schemes. For example, if more non-zero coefficients are clustered at the upper left corner of the block, zone 1 of the zig zag zoning scheme would contain more non-zero coefficients compared to the horizontal or vertical zoning schemes. In such event, using the zig zag scan would cause more of the non-zero coefficients to be scanned early on in scanning zone 1 so that there is a greater probability that the remaining coefficients in the other seven zones will be zeros or mostly zeros. Choosing one of the three scanning paths and one of the corresponding three zoning schemes resulting in the largest sum for the first zone at the output of modules 376, 378, 380 will reduce processing time and also the number of bits required to code the coefficients. Block 382 is a logic circuit which may be constructed in a manner known to those skilled in the art.

The structure of the module 376 is shown more clearly in FIG. 12. Horizontal scan module 376 may be a PROM which generates X, Y addresses for a horizontal scanning scheme to buffer 374. The 8 bit coefficient at such address X, Y is then sent from buffer 374 to a 1-bit detector 392. If the coefficient is non-zero, detector 392 would output a 1 whereas if the coefficient is zero, detector 392 would output a zero. The output of detector 392 is added by adder 394 and the sum stored in a buffer 396 where the sum is fed back to adder 394 to be added to the output of detector 392 in the next cycle. Thus, after PROM 376 generates all of the eight addresses for the first row (Zone 1) of the block, buffer 396 stores therein the total number of non-zero coefficients that has been scanned for the first row of the video block. The vertical scan module 378 and the zig zag scan 380 each may have the same structure as the horizontal scan module described above.

Block 382 therefore compares the sum stored in buffer 396 for the horizontal scan and the similar sums for the vertical and zig zag scans and find the largest of the three sums. Block 382 then sends an output scan path index which indicates which of the three scan paths has been chosen as the one to be used for coding.

In reference to FIG. 9, the scan path index is sent to the three mapping blocks 344, 346 and 348 to implement the selected scan path in the mapping process. The vector mapping block 344 is illustrates in more detail in FIG. 13. In response to the pixel index i indicating which pixel of the block is being scanned, the three PROMs 376', 378' and 380' each generates an X, Y address applied to a switch 402. The scan path index output from block 382 of FIG. 11A is applied to switch 402 to select the selected address to be applied to buffer 374. Detector 392 outputs a 1 if the coefficient from buffer 374 is non-zero and outputs a zero if the coefficient is zero. This 1-bit information is stored in the 8-bit form vector register 404 to form a form vector. Thus, the 8-bit form vector would represent as one ("1") each of the non-zero coefficients in the particular zone with the remaining zone coefficients being represented as zero ("0") in the form vector. This form vector is then sent to one of PROMs (1, 2, . . . , n, for n zones), one for a corresponding zone for selecting an appropriate vector pattern variable length code (VLC) as one of the outputs of vector mapping block 344. In FIGS. 11B–11D, n is 8. The quantized DCT coefficient from buffer 374 selected at address X, Y is also applied to another PROM 408 where the non-zero quantized coefficients are also coded in accordance with a lookup table to generate coefficient variable length codes (VLC). In this manner, a two-dimensional 8×8 quantized DCT coefficients are mapped into a one-dimensional vector and coefficient VLC. In the above vector mapping process, Huffman coding is employed. The coding procedure is as follows:

(1) Classify the pattern of zero/non-zero Transform coefficient for zone 1;
(2) Map the pattern for Zone 1 into Variable Length Codes (VLC);
(3) Group non-zero coefficients into pairs by pairing the successive frequency coefficients;
(4) For each pair of coefficient, look up the coefficient pair in a pre-stored PROM and send the lookup value as the output;
(5) Repeat step 1 to 4 up to zone n; and
(6) Send End of Block Code (EOB) whenever the remaining coefficients are zero.

In the above six steps, the first two are applied by means of detector 392 and form vector register 394 and steps three through five are performed by means of PROMs 406, 408. If eight zones are employed, then n in the above procedure has the value eight. Both the vector pattern VLC and coefficient VLC outputs of FIG. 13 are combined and sent to block 350 of FIG. 9 for decision. The block 346 is similar to block 344 except that run length encoding of zeros and coefficient values are used. Thus, in block 346, the following steps are employed:
(1) Classify the pattern of zero/non-zero Transform coefficients for zone 1;
(2) Map the pattern for zone 1 into Variable Length Codes (VLC);
(3) Group non-zero coefficients into pairs by pairing the successive frequency coefficients;
(4) For each pair of coefficient, look up the coefficient pair in a pre-stored PROM and send the lookup value as the output;
(5) For the remaining coefficient, use run-length encoding of runs of zeros and coefficient value; and
(6) Send End of Block Code (EOB) whenever the remaining coefficients are zero.

Frequently, the amplitudes of quantized DCT coefficients are all ones or zeros. In such event, the coding process may be simplified by skipping the form vector formation step and the number of bits required minimized by using an all ones Vector in block 348 using the following steps:
(1) Classify the pattern of zero/non-zero Transform coefficient for zone 1;
(2) Map the pattern for zone 1 into Variable Length Codes (VLC); and
(3) Repeat step 1 to 3 up to zone n.

As indicated above, block 350 of FIG. 9 selects the one output from blocks 344, 346, 348 that has the least number of bits and sends it out as variable length codes which combines the vector pattern VLC and the coefficient VLC of FIG. 13. Such variable length codes together with the scan path index from block 342 at a matrix index from block 340 together comprise the output of the VATQ block 312 for FIG. 7. As described above, the output of block 312 is multiplexed with the motion vector output of block 304 by multiplexer 320 and sent to the rate buffer 314 for transmission through a modem and a POTS line to a decoder as shown in FIG. 1.

The derivation of the reconstruction block will now be described in reference to FIGS. 7, 14 and 15. The output of block 312 is applied to an inverse VATQ block 420 which is shown in more detail in FIG. 14. As shown in FIG. 14, the output of block 312 is demultiplexed by a multiplexer (not shown) and the scan path index portion of the output of block 312 is used to select and enable one of three scan path PROMs 422, 424, 426 through a switch arrangement (not shown, but can be similar to the switch arrangement of FIG. 13). The selected PROM then generates the X, Y address for reading the appropriate ones and zeros into the DCT coefficient pattern buffer 430. The vector pattern VLC portion of the output of block 312 is applied to a vector pattern PROM 432 which generates an 8-bit output for application to buffer 430. The coefficient VLC portion of the output of block 312 is sent to PROM 434 which performs the inverse lookup table of PROM 408 of FIG. 13 to generate the actual non-zero coefficients that were coded in block 408. Such coefficients are matched with the non-zero locations of DCT coefficients in buffer 430 so that buffer 436 stores the restored quantized DCT coefficients identical to those stored in buffer 374 of FIG. 13. The matrix index portion of the output of block 312 is applied to an inverse frequency weighted quantization block 348 which performs the inverse operation of block 340 of FIG. 9. The reconstructed DCT coefficients are then stored in buffer 440 and sent to inverse DCT block 450 in FIG. 7.

Inverse DCT block 450 may be of a conventional design. The output of block 450 is added by adder 452 to the reconstructed block previously used in deriving the temporal difference TD' to become the previous frame stored in frame store 310. Frame store 310 stores the current or new frame as well as the previous frame from adder 352.

The derivation of the reconstructed block will now be described by reference to FIG. 15. In reference to FIG. 15, buffer 460 stores a frame which has been selected as the background frame. This frame may simply be the very first frame received by the overall video system and obtained from the previous frame in store 310. Subpixel motion estimation and prediction are performed by blocks 462, 464 in accordance with MPEG standards to provide a prediction block which is applied to block 466. A new block is fetched from store 310 and stored in buffer 468 and is applied also to block 466. Block 466 then computes the mean square error MSE-pf between the new block and the prediction block derived from the previous frame and applies such output to decision block 470. A background block is obtained from the background frame store 460 and stored in buffer 472. Then block 474 computes the mean square error between the new block from buffer 468 and the background block from buffer 472 to derive the background mean square error MSE-bg and applies this quantity to decision block 470. Decision block 470 may simply be a comparator. Decision block 470 causes multiplexer 476 to pass the prediction block that has the smaller mean square error.

Thus, in a previous frame, a person may have moved his or her head to obscure a portion of the background but in the current frame has returned to the original position exposing the background. In such event, using the background frame as the prediction block will result in a smaller mean square error for encoding the new block and reduces the number of bits required for coding. The prediction block is then stored in buffer 478 and applied to adder 302 in FIG. 7 to derive the temporal difference TD'.

The decoder would now be described in reference to FIGS. 1, 7, 14 and 16. As indicated above, the output of rate buffer 314 is sent over a transmission medium to decoder 110 in FIG. 1. The decoder stores the bit stream in a FIFO 502 and decodes it using a VLCD decoder PROM 504 into matrix index, motion vectors and VATQ vectors which include the variable length codes from block 350 as well as the scan path index. The inverse VATQ block 506 is the same as block 420 of FIG. 14. The motion vectors are sent to a motion compensation block 510 and added to the output of inverse DCT block 508 to form the new frame stored in buffer 514 ready to be displayed. The motion compensation block 510 may be any one of a conventional design.

Post-Processing

The coding process may introduce certain artifacts which are undesirable. The post-processing feature of this invention reduces such artifacts and enhances the image. In reference to FIGS. 1 and 16, the new frame stored in buffer 514 is sent to decode reference memory 112 of FIG. 1 for storage.

In reference to FIG. 17, the current frame stored in decode reference memory 112 is fetched and filtered by a horizontal block boundary filter 530 and a vertical block boundary filter 532. Each of the two filters may be implemented in ASIC such as field programmable gate arrays. Alternatively, they may be implemented in software using a digital signal processor. The filtered output is then further filtered by an adaptive edge enhancement filter and transformed to RGB for display. Again, the adaptive edge enhancement 534 may either be implemented in ASIC or as controlled by software through a post-processing controller 536.

The horizontal and vertical block boundary filters are illustrated in FIGS. 18 and 19 respectively. Since the quantization and coding are performed in blocks, when the reconstructed blocks are put back together as a frame in decoding, there may be artifacts at the boundaries of the blocks. To reduce the effects of these artifacts, the following filtering algorithms are employed:

Vertical filter: new pixels values=((left pixel)+2*(middle pixel)+(right pixel))/4

Horizontal filter: new pixels values=((upper pixel)+(lower pixel))/4

First, the boundary pixel values of the blocks are detected. Each boundary pixel value and at least two pixel values that are adjacent to such boundary pixel value and that are not boundary pixel values of the same block as such boundary pixel value are multiplied by a predetermined factor to obtain products. Each boundary pixel value and such at least two pixel values form a group. In FIGS. 18, 19, the boundary pixels along the vertical and horizontal boundaries respectively are shown as black dots, where the blocks are 8 by 8 arrays. Group 550 in FIG. 18 therefore includes the boundary pixel value 552 of block 558 and at least two pixel values 554 and 556 that are not boundary pixel values of block 558. After multiplying each value in the group by predetermined factors, the products are then summed to obtain a new pixel value. Thus, after each of the pixel values 552, 554 and 556 are multiplied each by a predetermined factor, the products are then summed and is then used as new pixel value at the location at pixel value 552 and to replace it.

It is also found that in the quantizing and encoding that if the number of bits generated generally matches the number of bits allocated, the image sent is of good quality and can be further enhanced by multiplying the frame pixel values by elements of one of two predetermined matrices such as those shown in FIG. 21. Otherwise the pixel values are multiplied by the elements of the other matrix. For this purpose, the matrix indices from PROM 364 used to select the appropriate matrices of all the blocks in the current frame are summed together and averaged to obtain the average quantizer AVEQUANT of all the blocks.

If AVEQUANT>Hi-Threshold, matrix A is used. If AVEQUANT<Hi-Threshold, matrix B is used. In the preferred embodiment, Hi-Threshold has a value of 45. Such operation is illustrated in FIG. 20. The output of the adaptive edge enhancement is then ready to be displayed.

The invention has been described by reference to the preferred embodiment. It will be understood that various modifications may be made without departing from the scope of the invention which is to be limited only by the appended claims.

What is claimed is:

1. A method for encoding frames of digitized video information, wherein the frames are divided into blocks, and wherein numbers of bits available for encoding video information change over time so that the number of bits available for encoding a frame may differ from the number of bits available for encoding a subsequent frame, said method comprising:

performing a spatial domain to transform domain transformation of video information related to each block of a frame to obtain a corresponding block of transform coefficients;

ascertaining the number of bits available for encoding said frame;

allocating a number of bits to the encoding of each block of transform coefficients for all the blocks in said frame; and quantizing and coding each block of transform coefficients to generate variable length coding bits for each block, wherein the number of bits generated for each block is a function of the number of bits allocated to the encoding of a different block.

2. The method of claim 1, wherein said blocks of the frame are encoded sequentially in a time sequence, wherein the number of bits generated in the quantizing and coding of a block of transform coefficients is a function of the number of bits allocated to the encoding of a subsequent block in the time sequence in a look-ahead bit allocation scheme.

3. The method of claim 2, said method further comprising:

prior to quantizing and coding a block of transform coefficients, determining the sum total number of bits generated in quantizing and coding all blocks of transform coefficients that precede such block in the time sequence, if any;

wherein said step of quantizing such block of transform coefficients uses information regarding the sum total number of bits allocated to all the blocks of the frame that have been quantized and coded up to such quantizing step, and the sum total number of bits generated in quantizing and coding all the preceding blocks of transform coefficients, to control at such quantizing step the number of variable length coding bits generated for such block.

4. An apparatus for encoding frames of digitized video information, wherein the frames are divided into blocks, and wherein numbers of bits available for encoding video information change over time so that the number of bits available for encoding a frame may differ from the number of bits available for encoding a subsequent frame, said apparatus comprising:

means for performing a spatial domain to transform domain transformation of video information related to each block of a frame to obtain a corresponding block of transform coefficients;

means for ascertaining the number of bits available for encoding said frame;

means for allocating a number of bits to the encoding of each block of transform coefficients for all the blocks in said frame; and means for quantizing and coding each block of transform coefficients to generate variable length coding bits for each block, wherein the number of bits generated is a function of the number of bits allocated to the encoding of a different block of transform coefficients.

5. A method for encoding frames of pixel values of video information, wherein the frames are divided into blocks, said method comprising:

performing a spatial domain to transform domain transformation of video information related to each block of a frame to obtain a corresponding block of transform coefficients;

quantizing and coding each block of transform coefficients to generate variable length coding bits for each block, wherein the quantizing step is performed by reference to one index within a set of numerical indices indicating number of bits resulting from the quantizing step, and wherein said indices have values that vary directly with the number of bits resulting from the quantizing step;

computing an average value of the indices by reference to which the blocks of a frame have been quantized and coded in the quantizing and coding step;

comparing said average value to predetermined range values; and multiplying each pixel value by a selected matrix element when the average value is within predetermined range values.

6. A method for encoding frames of digitized video information, wherein the frames are divided into blocks, said method comprising:

performing a spatial domain to transform domain transformation of video information related to each block of a frame to obtain a corresponding block of transform coefficients;

quantizing and coding each block of transform coefficients to generate variable length coding bits for each block, wherein said coding step includes:

first scanning at least some of the coefficients of each block along at least two different paths and counting the number of nonzero scanned coefficients along each path to obtain at least two numbers;

comparing the numbers obtained to find the largest of the numbers; and scanning the coefficients of each block along the path that results in the largest number before coding each block of transform coefficients.

7. The method of claim 6, further comprising:

dividing each block into two or more sets of zones each corresponding to a scan path, wherein said first scanning step scans only the coefficients in one of the zones along said different paths.

8. A method for encoding frames of digitized video information, wherein the frames are divided into blocks, said method comprising:

performing a spatial domain to transform domain transformation of video information related to each block of a frame to obtain a corresponding block of transform coefficients;

quantizing and coding each block of transform coefficients to generate variable length coding bits for each block;

dividing each block into two or more sets of zones; and forming a scan vector of at least one zone and variable length coding of coefficients of said at least one zone.

9. The method of claim 8, further comprising;

detecting whether the remaining coefficients are zero after said forming step; and sending end of block when the remaining coefficients are detected to be zero after said forming step.

10. The method of claim 8, wherein said forming step also detects whether the vector formed contains all 1's or 0's.

11. A method for encoding frames of video information, said frames divided into blocks, wherein the frames are encoded sequentially in a time sequence, so that each block in a frame has a corresponding block in a different frame, said method comprising:

performing a spatial domain to transform domain transformation of video information related to each block of a frame to obtain a corresponding block of transform coefficients;

quantizing and coding each block of transform coefficients to generate variable length coding bits for each block;

reconstructing each block from its variable length coding bits;

storing said reconstructed block;

storing a predetermined frame of video information as the background frame, said frame containing a background block corresponding to said reconstructed block;

comparing a current block to be quantized and coded to said reconstructed block and to the background block to determine a prediction block; and using the prediction block to derive said video information related to each block that is transformed in said performing step.

* * * * *